(12) United States Patent
Yu et al.

(10) Patent No.: US 12,522,569 B2
(45) Date of Patent: Jan. 13, 2026

(54) SUBSTITUTED BENZIMIDAZOLE DERIVATIVE AND USE THEREOF

(71) Applicant: Chengdu FANXI Biopharma Co., Ltd., Sichuan (CN)

(72) Inventors: Niefang Yu, Sichuan (CN); Xin Chen, Sichuan (CN); Hao Li, Sichuan (CN); Xiaoyu Liu, Sichuan (CN)

(73) Assignee: Chengdu FANXI Biopharma Co., Ltd. (CN)

( * ) Notice: Subject to any disclaimer, the term of this patent is extended or adjusted under 35 U.S.C. 154(b) by 533 days.

(21) Appl. No.: 18/008,818

(22) PCT Filed: Jul. 6, 2021

(86) PCT No.: PCT/CN2021/104628
§ 371 (c)(1),
(2) Date: Dec. 7, 2022

(87) PCT Pub. No.: WO2022/007772
PCT Pub. Date: Jan. 13, 2022

(65) Prior Publication Data
US 2023/0227412 A1    Jul. 20, 2023

(30) Foreign Application Priority Data

Jul. 10, 2020  (CN) .......................... 202010664800.9

(51) Int. Cl.
| C07D 235/08 | (2006.01) |
| C07D 235/10 | (2006.01) |
| C07D 235/14 | (2006.01) |
| C07D 235/16 | (2006.01) |
| C07D 235/30 | (2006.01) |

(52) U.S. Cl.
CPC ......... *C07D 235/08* (2013.01); *C07D 235/10* (2013.01); *C07D 235/14* (2013.01); *C07D 235/16* (2013.01); *C07D 235/30* (2013.01)

(58) Field of Classification Search
CPC .................................................. C07D 235/08
See application file for complete search history.

(56) References Cited

U.S. PATENT DOCUMENTS

| 5,958,961 A | 9/1999 | Inada et al. |
| 7,005,440 B1 | 2/2006 | Jayyosi et al. |

| 2007/0082907 A1 | 4/2007 | Canada et al. |
| 2007/0207175 A1 | 9/2007 | Clary et al. |
| 2010/0240580 A1 | 9/2010 | Zoller et al. |

FOREIGN PATENT DOCUMENTS

| CN | 101014328 A | 8/2007 |
| CN | 101100458 A | 1/2008 |
| CN | 101784528 A | 7/2010 |
| JP | 2002543065 A | 12/2002 |
| JP | 2005508318 A | 3/2005 |
| JP | 2007514659 A | 6/2007 |
| WO | 03024395 A2 | 3/2003 |
| WO | 2019057969 A1 | 3/2019 |

OTHER PUBLICATIONS

Alzheimer's disease [online] retrieved from the internet on Mar. 25, 2022 URL https://www.mayoclinic.org/diseases-conditions/alzheimers-disease/symptoms-causes/syc-.*
Chen, et al. Amyloid beta:structure, biology and structure-based therapeutic development. Acta Pharmacologica Sinica 2017:1205-1235.*
International Search Report for Application No. PCT/CN2021/104628 mailed Sep. 18, 2021, pp. 1-4.

* cited by examiner

*Primary Examiner* — Shawquia Jackson
(74) *Attorney, Agent, or Firm* — Lerner David LLP

(57) ABSTRACT

The present invention relates to a substituted benzimidazole derivative as represented by formula (I) and a pharmaceutically acceptable salt, a polymorph, a tautomer, a stereoisomer, a hydrate, a solvate or an isotopic variant of the derivative. The compound is a PPAR α and/or PPAR δ agonist, therefore the compound can be used for treating and/or preventing diseases associated with by PPAR α and/or PPAR δ, such as non-alcoholic steatohepatitis, Duchenne muscular dystrophy syndrome, Alzheimer's disease, tumors and PBC (primary biliary cholangitis)

formula (I)

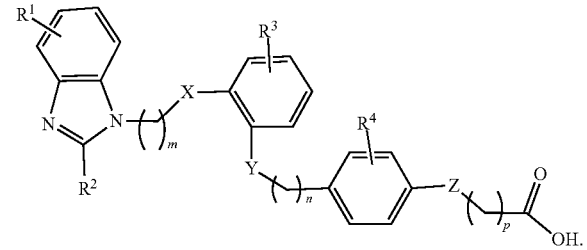

13 Claims, No Drawings

SUBSTITUTED BENZIMIDAZOLE DERIVATIVE AND USE THEREOF

CROSS REFERENCE

The present application is a national phase entry under 35 U.S.C. § 371 of International Application No. PCT/CN2021/104628, filed Jul. 6, 2021, which claims priority from Chinese Patent Application No. 202010664800.9, filed on Jul. 10, 2020, the disclosure of which are hereby incorporated herein by reference.

TECHNICAL FIELD

The present invention relates to novel organic compounds, substituted benzimidazole derivatives and their uses, especially those compounds that have agonistic effects on the δ subtype peroxidase proliferator-activated receptor (PPARS), and their preparation methods as well as their applications in the treatment of cardiovascular diseases.

BACKGROUND

Metabolic syndrome that has characteristics such as obesity, insulin resistance (type I diabetes), lipid metabolism disorders, and hypertension represents a serious threat to human health, particularly in an aging society.

Metabolic syndrome refers to various corresponding symptoms caused by the imbalance or disorder of lipid metabolism balance, energy balance and glucose metabolism balance. Therefore, therapeutic regimens aimed at maintaining energy balance, fat and sugar homeostasis are an effective treatment for metabolic syndrome. Nuclear receptors (NRs) play an important role in maintaining energy balance, fat and sugar homeostasis in cells and even in an entire individual. Among those nuclear receptors, peroxisome proliferator-activated receptors (PPARs) are one of the important families (Acta Cryst., 2009, D65, 786-795; J. Med. Chem 2012, 55, 4027-4061; Nature Reviews Cancer, 2012, 12:181-189; Immunology Letters, 2020, 220:32-37).

There are three main subtypes of PPARs: alpha, gamma and delta. These receptors belong to the superfamily of nuclear receptors and transcription factors, and can be activated when contacted by certain fatty acids and/or their fat metabolites. Activated PPARs form heterodimers with 9-cis retinoic acid receptors (RXR or retinoid X receptors) and binds to specific response elements (PPRE or peroxisome proliferator response elements) of target gene promoters, thereby providing transcriptional control (Pharmacology & Therapeutics, 2017, 179:142-157; The Journal of Biological Chemistry, 1999, 274:6718-6725; Signal Transduction and Targeted Therapy, 2020. 5:4-5).

PPARα controls lipid metabolism (of liver and muscle) and glucose homeostasis, affects intracellular lipid and carbohydrate metabolism by directly controlling the transcription of genes encoding proteins involved in lipid homeostasis, demonstrates anti-inflammatory and antiproliferative activities, and prevents the atherogenic effect of cholesterol accumulated in macrophages by stimulating cholesterol efflux (Expert Opinion on Investigational Drugs, 2014, 23:10, 1441-1448; Bioorg. Med. Chem. 2007, 15, 5177-5190).

PPRAγ is a key regulator of adipogenesis. Furthermore, PPRAγ is involved in lipid metabolism in mature adipocytes, glucose homeostasis, especially insulin resistance, inflammation, macrophage cholesterol accumulation and cell proliferation. Therefore, PPRAγ plays a role in the pathogenesis of obesity, insulin resistance and diabetes (Nature Reviews Cancer, 2012, 12:181-189). In addition, PPRAδ is involved in the control of lipid and carbohydrate metabolism, energy balance, neurodegeneration, obesity, macrophage foam cell formation and inflammation (Scientific Reports, 2016, 6, 1-12).

Recent animal pharmacological experimental model studies have shown that PPARS can enhance fatty acid catabolism and energy uncoupling in adipose tissue and muscle, inhibit macrophage-derived inflammation, control weight gain from various aspects, enhance physical tolerance, improve insulin sensitivity and improve atherosclerosis. Therefore, PPARS ligands may be useful for the treatment of hyperlipidemia, obesity, insulin resistance, and atherosclerosis (Leukemia 2018, 32:184-193; Scientific Reports, 2019. 9:1-12).

Thus, the research and development of PPAR subtypes, especially PPARα/δ agonists, has become an important area of academia and industry.

Elafibranor from Genfit Corporation is a drug that has been quickly developed (FR2864956A1; Expert Opinion on Investigational Drugs, 2014, 23:10, 1441-1448). Elafibranor or GFT-505, chemical name: 1-(4-methylthiophenyl)-3-(3,5-dimethyl-4-carboxydimethylmethoxyphenyl)prop-2-en-1-one (with the following structure), is an agonist developed by Genfit Corporation. As a lipid metabolism ameliorator, the compound is used in the treatment of dyslipidemia, type 2 diabetes, non-alcoholic fatty liver diseases, which now has entered Phase III clinical trials.

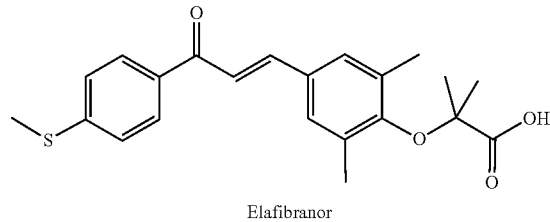 [SMILES: CSc1ccc(C(=O)/C=C/c2cc(C)c(OC(C)(C)C(=O)O)c(C)c2)cc1]

Elafibranor

In addition, WO9728115A1 described the use of L-165041 (Merck) as a drug to treat diabetes and an anti-obesity drug, and WO2004007439A1 described the use of a drug for increasing HDL in blood containing biaryl derivatives. Similar patents also include U.S. Pat. No. 7,781,469B2 (pyrazole derivatives, Lilly), US20100029949A1 (benzisoxazole derivatives, Takeda), WO2003072100A1 (thiophene derivatives, Eli, Lilly), WO2017180818A1 (imidazole derivatives, Mitobridge).

Despite the existence of Elafibranor and their related studies, society still has high expectations for the treatment of PPARα/δ-mediated diseases. In particular, improving the pharmacokinetic properties or/and pharmacodynamic performance of related drugs still requires continuous efforts.

On the other hand, the present inventors have also filed patent applications (WO 01/79197, WO 03/033493, etc.) for compounds extended to a benzisoxazole derivatives with transcriptional activating effect of PPARS.

The compounds of the present invention represented by the general formulae (I) and (II) described later are clearly different structurally from the above-mentioned GW-501516, and these compounds have not yet appeared in the literature.

SUMMARY

Compounds described by formula (I) or their pharmaceutically acceptable salts, polymorphs, tautomers, stereoisomers, hydrates, solvates or isotopic variants:

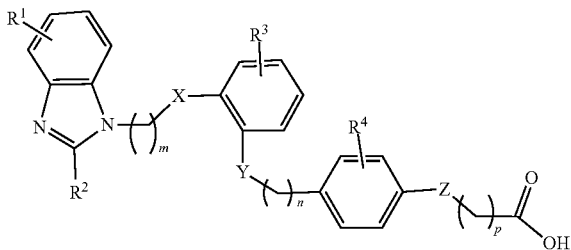

formula (I)

wherein $R^1$ is selected from: H, —CN, —$NO_2$, —$CF_3$, —$OCF_3$, —$CO_2H$, OH, halogen, amino, alkyl, alkenyl, haloalkyl, haloalkenyl, heteroalkyl, heterocycloalkyl, arylalkyl, cycloalkyl, aryl, heterocycloaryl, heterocycloaryl alkyl, heterocycloalkyl, heterocycloalkenyl, alkoxy, alkoxyalkyl, alkenyloxy, alkynyloxy, amino, alkylamino, aminoalkyl, alkylaminocarbonyl, sulfonyl, alkylsulfonyl, alkylsulfinyl, aminosulfonyl, acyl; in which, each can be un-substituted or substituted with one or more substituents, the substituents comprise halogen, —$CF_3$, alkyl, alkenyl, alkynyl, hydroxyl, hydroxyalkyl, alkoxy, alkoxyalkyl.

$R^1$ can be a non-hydrogen substituent or two or more different non-hydrogen substituents.

$R^2$ is selected from H, —CN, —$NO_2$, —$CF_3$, —$OCF_3$, —$CO_2H$, OH, —$CONHR^5$, —$CSNHR^6$, —$SR^7$, halogen, amino, alkyl, alkenyl, haloalkyl, haloalkenyl, heteroalkyl, heterocycloalkyl, arylalkyl, cycloalkyl, aryl, heterocycloaryl, heterocycloarylalkyl, heterocycloalkyl, heterocycloalkenyl, alkoxy, alkoxyalkyl, alkylamino, alkylaminocarbonyl, sulfonyl, alkylsulfonyl, alkylsulfinyl, aminosulfonyl; in which, each can be un-substituted or substituted with one or more substituents, the substituents comprise: halogen, —$CF_3$, alkyl, alkenyl, alkynyl, hydroxy, hydroxyalkyl, alkoxy, alkoxyalkyl.

$R^2$ can be a non-hydrogen substituent or two or more different non-hydrogen substituents. $R^3$ is selected from H, —CN, —$NO_2$, —$CF_3$, —$OCF_3$, —$CO_2H$, OH, —$SR^7$, halogen, amino, alkyl, alkoxy, alkoxyalkyl, heteroalkyl, heterocycloalkyl, arylalkyl, cycloalkyl, heterocycloarylalkyl, heterocycloalkyl, heterocycloalkenyl, alkenyloxy, alkynyloxy, alkylamino, aminoalkyl, alkylaminocarbonyl; in which, each can be un-substituted or substituted with one or more substituents the substituents comprise: halogen, —$CF_3$, alkyl, alkenyl, alkynyl, hydroxy, hydroxyalkyl, alkoxy, alkoxyalkyl.

$R^3$ can be a non-hydrogen substituent or two or more different non-hydrogen substituents.

$R^4$ is selected from H, —CN, —$NO_2$, —$CF_3$, —$OCF_3$, —$SR^7$, halogen, amino, alkyl, alkoxy, alkoxyalkyl, heteroalkyl, heterocycloalkyl, arylalkyl, cycloalkyl, heterocycloarylalkyl, heterocycloalkyl, heterocycloalkenyl, alkenyloxy, alkynyloxy, alkylamino, aminoalkyl, alkylaminocarbonyl; in which, each can be un-substituted or substituted with one or more substituents, the substituents comprise: halogen, —$CF_3$, alkyl, alkenyl, alkynyl, hydroxy, hydroxyalkyl, alkoxy, alkoxyalkyl.

$R^4$ can be a non-hydrogen substituent or two or more different non-hydrogen substituents.

$R^5$ is selected from H, alkyl, heterocycloalkyl, arylalkyl, cycloalkyl, aryl, heterocycloaryl, heterocycloarylalkyl, heterocycloalkyl, heterocycloalkenyl.

$R^6$ is selected from H, alkyl, heterocycloalkyl, arylalkyl, cycloalkyl, aryl, heterocycloaryl, heterocycloarylalkyl, heterocycloalkyl, heterocycloalkenyl.

$R^7$ is selected from H, alkyl, heterocycloalkyl, cycloalkyl, aryl, heterocycloaryl, heterocycloalkyl, heterocycloalkenyl.

m, n and p are independently selected from 0-6;

X, Y and Z are independently selected from covalent bond, $(CH_2)_q$, —O—, —S—, —NH—, —$SO_2$—, —CONH—; wherein q is 0-4.

In some embodiments, A is preferably H, $C_1$-$C_{10}$ alkyl, $C_1$-$C_{10}$ alkenyl, $C_1$-$C_{10}$ heteroalkyl, alkynyl, alkylaminocarbonyl, sulfonyl, alkylsulfonyl, alkylsulfinyl, amino sulfonyl, acyl; in which, each can be un-substituted or substituted with one or more substituents, the substituents comprise: halogen, alkyl, alkenyl, alkynyl, haloalkyl, haloalkenyl.

In another embodiment, X is preferably a covalent bond.

In another embodiment, Y is preferably —O— and —S—.

In another embodiment, Z is preferably a covalent bond.

In another embodiment, Z is preferably —O—.

In another embodiment, Y is preferably a covalent bond, —O— and —S—.

In another embodiment, $R^1$ is preferably —Br, and is preferably connected to $C_5$ position on the benzimidazole ring, i.e., $C_5$—Br.

In another embodiment, $R^2$ is preferably $C_1$-$C_4$ alkyl.

In one or more embodiments, $R^2$ is selected from H, hydroxyl, halogen, $C_{1-14}$ alkyl, $C_{2-14}$ heteroalkyl, $C_{1-6}$alkyloxy$C_{1-4}$alkyl, of which each is un-substituted or substituted with one or more substituents selected from the following group: halogen, —$CO_2H$, OH, $C_{1-14}$ alkyl, $C_{2-14}$ heteroalkyl, $C_{3-9}$ cycloalkyl, $C_{4-7}$ heterocycloalkyl, $C_{1-6}$ alkyloxy, $C_{5-12}$aryl$C_{1-14}$ alkyl.

In one or more embodiments, $R^3$ is selected from H, hydroxyl, halogen, $C_{1-14}$alkyl, $C_{2-14}$ heteroalkyl, $C_{1-6}$alkyloxy$C_{1-14}$alkyl, each is un-substituted or substituted with one or more substituents selected from the following group: halogen, —$CO_2H$, OH, $C_{1-14}$alkyl, $C_{2-14}$ heteroalkyl, $C_{3-9}$cycloalkyl, $C_{4-7}$heterocycloalkyl, $C_{1-6}$alkyloxy, $C_{5-12}$aryl$C_{1-14}$alkyl.

In one or more embodiments, the compound is selected from the following compounds or their pharmaceutically acceptable salts:

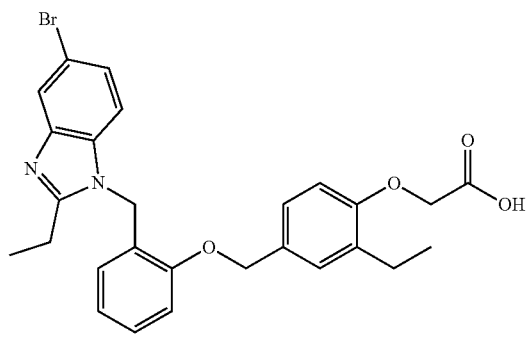

1 m/z[MH]$^+$ 522.12

5
-continued
2
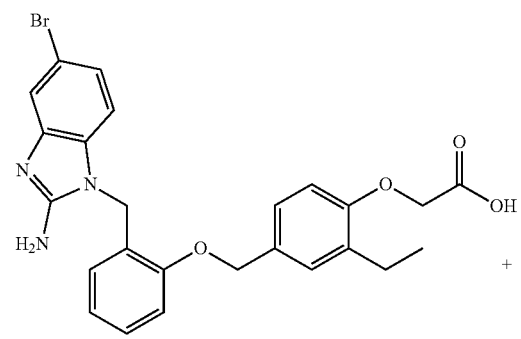 [SMILES: CCc1cc(COc2ccccc2Cn2c(N)nc3cc(Br)ccc32)ccc1CCC(=O)O]
m/z[MH]+ 509.10
3
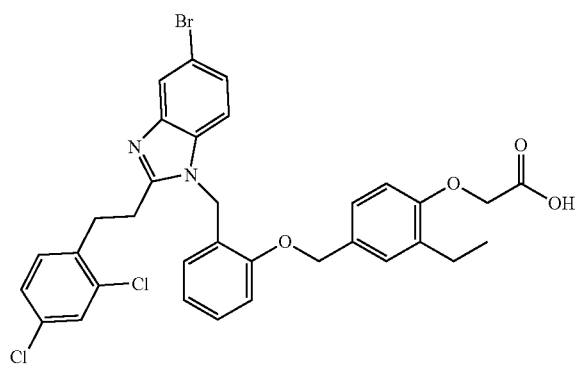
m/z[MH]+ 644.09
4
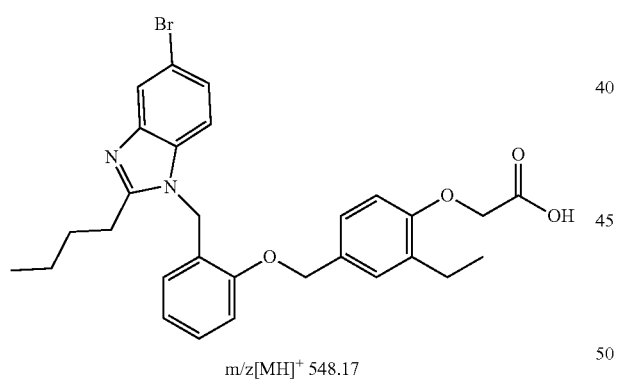
m/z[MH]+ 548.17
5
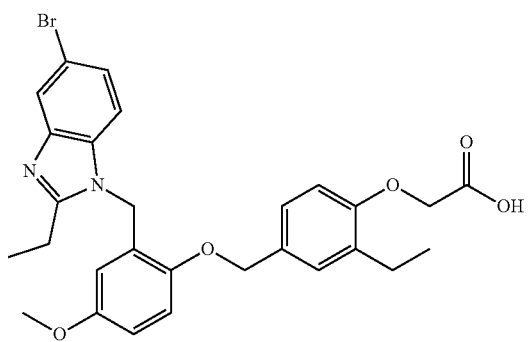 [SMILES: CCc1cc(COc2ccc(OC)cc2Cn2c(CC)nc3cc(Br)ccc32)ccc1CCC(=O)O]
m/z[MH]+ 552.13
6
-continued
6
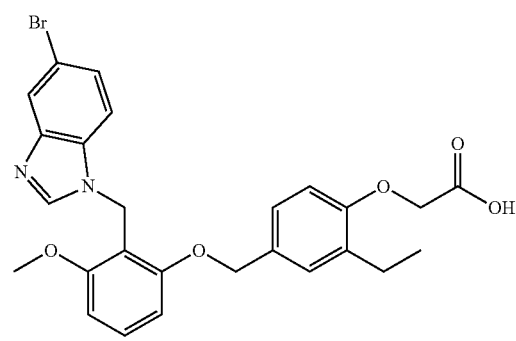 [SMILES: CCc1cc(COc2cccc(OC)c2Cn2cnc3cc(Br)ccc32)ccc1CCC(=O)O]
m/z[MH]+ 552.12
7
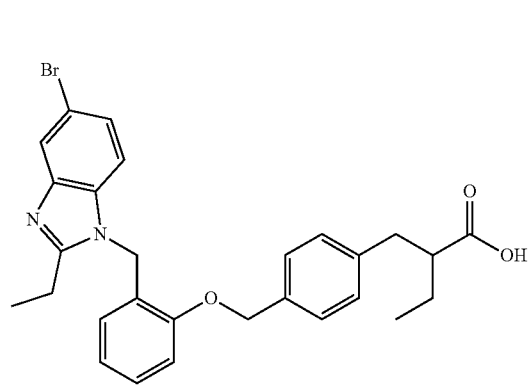 [SMILES: CCc1nc2cc(Br)ccc2n1Cc1ccccc1OCc1ccc(CC(CC)C(=O)O)cc1]
m/z[MH]+ 520.14
8
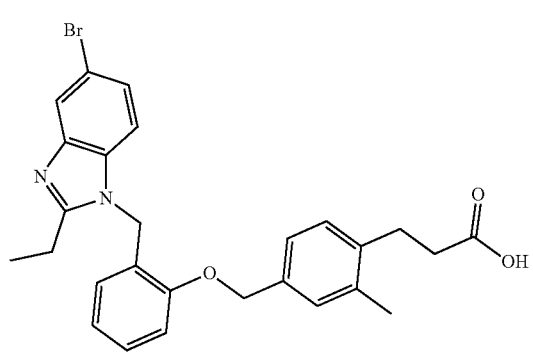 [SMILES: CCc1nc2cc(Br)ccc2n1Cc1ccccc1OCc1ccc(CCC(=O)O)c(C)c1]
m/z[MH]+ 506.12
9
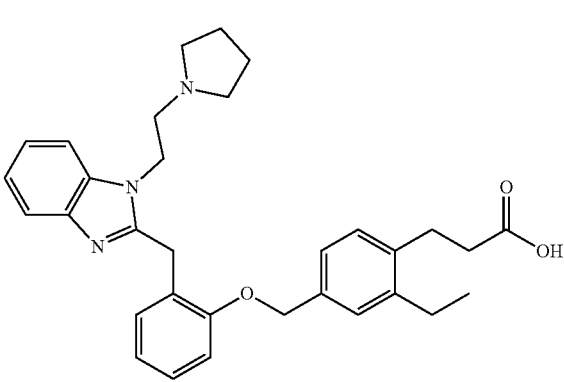
m/z[MH]+ 511.28

-continued
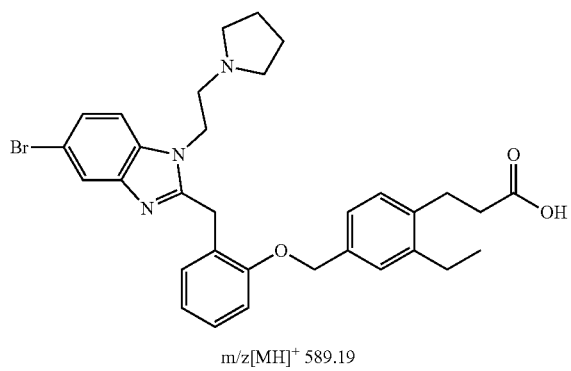
m/z[MH]+ 589.19
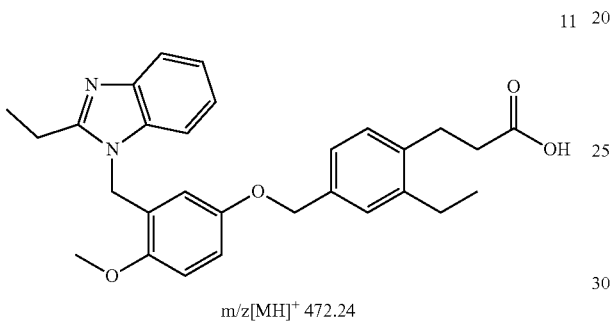
m/z[MH]+ 472.24
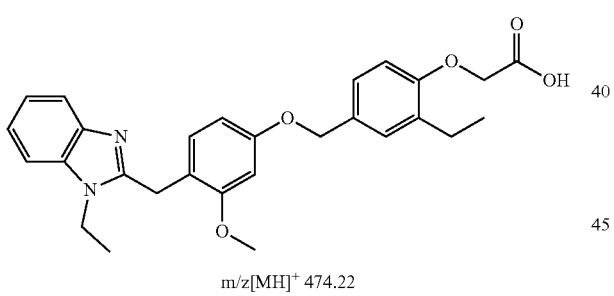
m/z[MH]+ 474.22
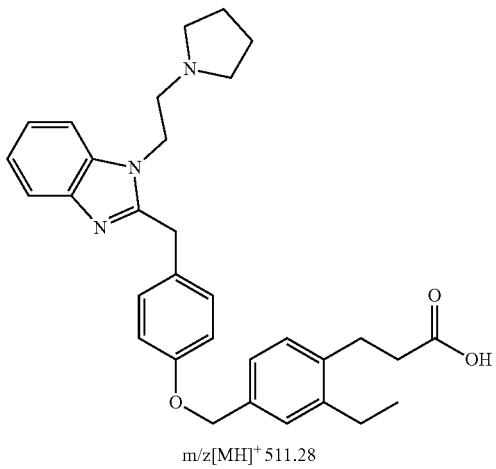
m/z[MH]+ 511.28
-continued
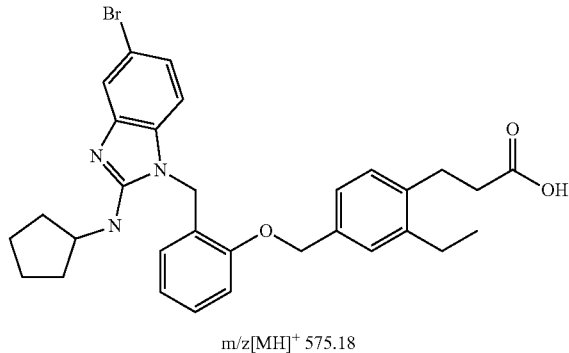
m/z[MH]+ 575.18
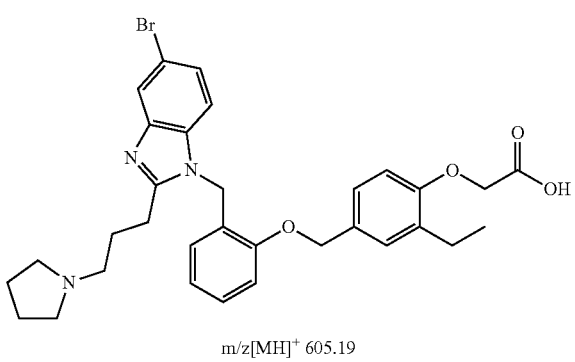
m/z[MH]+ 605.19
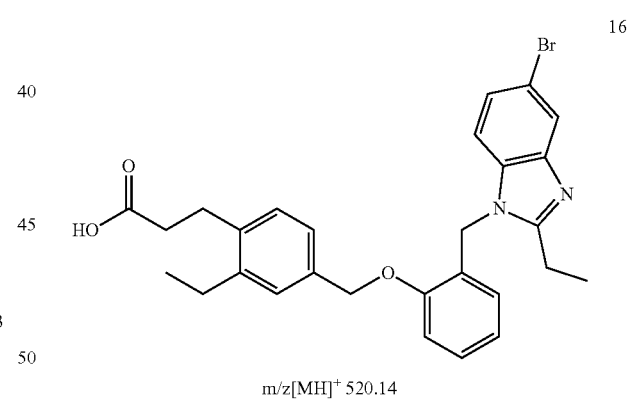
m/z[MH]+ 520.14
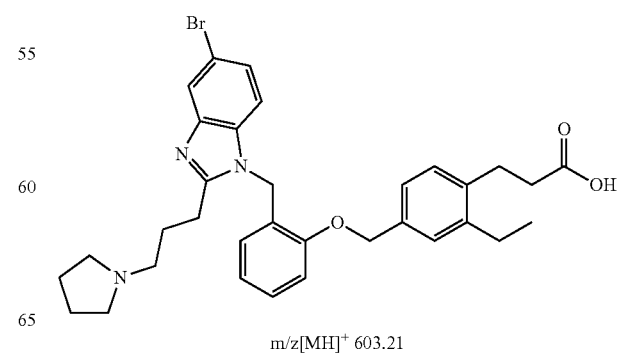
m/z[MH]+ 603.21

18

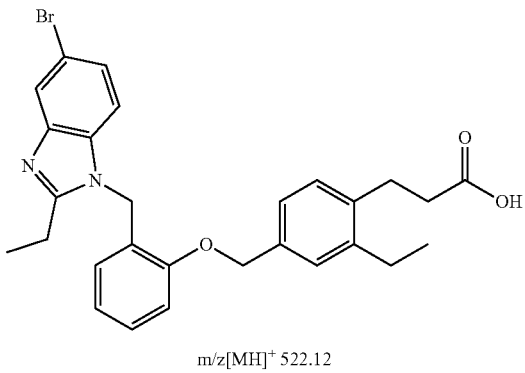

m/z[MH]⁺ 522.12

In addition to those compounds represented by formula (I), the present invention also comprises their pharmaceutically acceptable salts, polymorphs, tautomers, stereoisomers, hydrates, solvates or isotopic variants, pharmaceutically acceptable prodrugs and pharmaceutically active metabolites, and pharmaceutically acceptable salts of these metabolites.

One or more embodiments of the present application provides a pharmaceutical composition comprising the compound of the present application and pharmaceutically acceptable diluents, excipients or carriers.

The present invention comprises any pharmaceutical preparations formed by the compound represented by general formula (I) and a pharmaceutically acceptable diluent, excipient or carrier.

The compounds mentioned above are PPARα and PPARS agonists. Thus, the present invention provides methods for treating and/or preventing diseases caused by PPARα and/or PPARS using an effective amount of a compound of formula (I) alone or in combination with other medicines, for example, in the method of treating diseases such as nonalcoholic steatohepatitis, Duchenne muscular dystrophy, Alzheimer's disease and tumors.

The diseases caused by PPAR, especially by PPARα and PPARS, comprise but are not limited to the following diseases: hyperlipidemia, dyslipidemia, hyperchlolesterolemia, hypertriglyceridemia, HDL hypocholesterolemia, LDL hypercholesterolemia and/or HLD non-cholesterolemia, VLDL hyperproteinemia, dyslipoproteinemia, apolipoprotein A-I hypoproteinemia, disease of arterial sclerosis, disease of cardiovascular systems, cerebrovascular disease, peripheral circulatory disease, metabolic syndrome, syndrome X, obesity, diabetes, hyperglycemia, insulin resistance, impaired glucose tolerance, hyperinsulinism, diabetic complication, cardiac insufficiency, cardiac infarction, cardio myopathy, hypertension, fatty liver, non-alcoholic fatty hepatitis, thrombus, Alzheimer disease, neurodegenerative, demyelinating disease, multiple sclerosis, adrenal leukodystrophy, dermatitis, psoriasis, acne, skin aging, trichosis, inflammation, asthma, hyper sensitive intestine syndrome, ulcerative colitis, Crohn's disease, pancreatitis, or cancer including colon cancer, large intestine cancer, skin cancer, breast cancer, prostate cancer, ovary cancer, and lung cancer.

In another embodiment, PPARS mediated diseases are any kinds of dyslipidemia, metabolic syndrome, obesity, atherosclerosis or diabetes.

In another embodiment, PPARS mediated diseases are NASH and Duchenne muscular dystrophy syndrome.

In another embodiment, PPARS mediated diseases are primary biliary cirrhosis and cholangitis, including Alzheimer's disease and tumors.

In another embodiment, PPARS mediated diseases are increased energy and activation properties of T lymphocytes to enhance immune function, as well as transformation of tumor cells into adipose cells and reduced cancer metastasis, etc.

In another embodiment, the obesity is visceral fat obesity.

The present application also provides compounds of the present invention as described above for treating and/or preventing diseases mediated by PPARα and PPARS.

The present application also provides methods for treating and/or preventing diseases mediated by PPARα and PPARS, comprising administering to a subject in need thereof the compound of the present invention.

One or more embodiments of the present application provide use of the compounds of the present application or their pharmaceutically acceptable salts or compositions of the present application in preparing medicaments for treating and/or preventing diseases mediated by PPARα and/or PPARδ.

One or more embodiments of the present application provide compounds of the present application or their pharmaceutically acceptable salts for use as a medicament.

One or more embodiments of the present application provides compounds of the present application or their pharmaceutically acceptable salts which are used in treating and/or preventing the following diseases: hyperlipidemia, dyslipidemia, hyperchlolesterolemia, hypertriglyceridemia, HDL hypocholesterolemia, LDL hypercholesterolemia and/or HLD non-cholesterolemia, VLDL hyperproteinemia, dyslipoproteinemia, apolipoprotein A-I hypoproteinemia, disease of arterial sclerosis, disease of cardiovascular systems, cerebrovascular disease, peripheral circulatory disease, metabolic syndrome, syndrome X, obesity, diabetes, hyperglycemia, insulin resistance, impaired glucose tolerance, hyperinsulinism, diabetic complication, cardiac insufficiency, cardiac infarction, cardio myopathy, hypertension, fatty liver, non-alcoholic fatty hepatitis, thrombus, Alzheimer disease, neurodegenerative, demyelinating disease, multiple sclerosis, adrenal leukodystrophy, dermatitis, psoriasis, acne, skin aging, trichosis, inflammation, asthma, hyper sensitive intestine syndrome, ulcerative colitis, Crohn's disease, pancreatitis, or cancer including colon cancer, large intestine cancer, skin cancer, breast cancer, prostate cancer, ovary cancer, and lung cancer.

One or more embodiments of the present application provides compounds of the present application or their pharmaceutically acceptable salts, for use in the methods of treating and/or preventing the following diseases: any kinds of dyslipidemia, metabolic syndrome, obesity, atherosclerosis, diabetes, NASH, Duchenne muscular dystrophy syndrome, primary biliary cirrhosis, cholangitis, Alzheimer's disease, tumors, visceral fat obesity.

One or more embodiments of the present application provides compounds of the present application or their pharmaceutically acceptable salts, for use in methods of treating and/or preventing the following diseases: increased energy and activation properties of T lymphocytes to enhance immune function, as well as transformation of tumor cells into adipose cells and reduced cancer metastasis.

One or more embodiments of the present application provides compounds of the present application or their pharmaceutically acceptable salts, for use as PPARα and/or PPARS agonists.

One or more embodiments of the present application provides methods for treating diseases comprising administering to a subjects in need thereof the compound of the present application or a pharmaceutically acceptable salt of the compound or the composition of the present application, and the diseases comprise: hyperlipidemia, dyslipidemia, hyperchlolesterolemia, hypertriglyceridemia, HDL hypocholesterolemia, LDL hypercholesterolemia and/or HLD non-cholesterolemia, VLDL hyperproteinemia, dyslipoproteinemia, apolipoprotein A-I hypoproteinemia, disease of arterial sclerosis, disease of cardiovascular systems, cerebrovascular disease, peripheral circulatory disease, metabolic syndrome, syndrome X, obesity, diabetes, hyperglycemia, insulin resistance, impaired glucose tolerance, hyperinsulinism, diabetic complication, cardiac insufficiency, cardiac infarction, cardio myopathy, hypertension, fatty liver, non-alcoholic fatty hepatitis, thrombus, Alzheimer disease, neurodegenerative, demyelinating disease, multiple sclerosis, adrenal leukodystrophy, dermatitis, psoriasis, acne, skin aging, trichosis, inflammation, asthma, hyper sensitive intestine syndrome, ulcerative colitis, Crohn's disease, pancreatitis, or cancer including colon cancer, large intestine cancer, skin cancer, breast cancer, prostate cancer, ovary cancer, and lung cancer.

One or more embodiments of the present application provides methods for treating diseases comprising administering to a subject in need thereof any compound of the present application or its pharmaceutically acceptable salt or a composition of the present application, in which the diseases comprise: any kinds of dyslipidemia, metabolic syndrome, obesity, atherosclerosis, diabetes, NASH, Duchenne muscular dystrophy syndrome, primary biliary cirrhosis, cholangitis, Alzheimer's disease, tumors, visceral fat obesity.

One or more embodiments of the present application provides methods for treating diseases comprising administrating to a subject in need thereof any compound of the present application or its pharmaceutically acceptable salt or a composition of the present application, wherein the diseases comprise: increased energy and activation properties of T lymphocytes to enhance immune function, as well as transformation of tumor cells into adipose cells and reduced cancer metastasis.

One or more embodiments of the present application provides methods for activating PPAR α and/or PPARδ, the methods comprising administrating to the subject in need thereof any compound of the present application or its pharmaceutically acceptable salt or a composition of the present application.

EMBODIMENTS

Definition

As used in the present application, the term "the compounds of the present invention" refers to compounds of formula (I). The term also comprises all crystal forms, pharmaceutically acceptable salts, hydrates or solvates of compounds of formula (I).

The term used in the present invention "un-substituted" refers to having no substituent or being only substituted by hydrogen.

A part of the terms used in the present invention are defined as follows:

"halogen" refers to fluorine, chlorine, bromine and iodine.

"alkyl", when acts as a functional group or a moiety of a functional group, refers to a straight or branched chain aliphatic hydrocarbon group. Preferably, alkyl is a $C_1$-$C_{14}$ alkyl, more preferably a $C_1$-$C_{10}$ alkyl, most preferably a $C_1$-$C_6$ alkyl, unless otherwise specified. Examples of straight or branched chain $C_1$-$C_6$ alkyl comprise but are not limited to methyl, ethyl, n-propyl, 2-propyl, n-butyl, isobutyl, tert-butyl, hexyl.

"alkylamino" comprise both mono-alkylamino and dialkylamino, unless otherwise specified. "Mono-alkylamino" refers to (alkyl —NH)—, "di-alkylamino" refers to: ((alkyl)$_2$N)—. In the above alkylaminos, alkyl is as defined herein. The alkyl group is preferably a $C_1$-$C_6$ alkyl group. Examples comprise but are not limited to N-methylamino, N-ethylamino, N-isopropylamino, N,N-(diethyl)amino, etc.

"Amino alkyl" refers to (amino-alkyl)-, wherein the alkyl is as defined herein. Examples comprise but are not limited to amino ethyl, 1-amino propyl, 1-amino propyl, etc.

"Arylamino" comprises both mono-arylamino and di-arylamino, unless otherwise specified. Mono-arylamino refers to (aryl-)NH—, and di-arylamino refers to (aryl)$_2$N—; For the definition of aryl, see the relevant section of this application.

"Acyl" comprises (alkyl-CO)— and (aryl-CO)—, unless otherwise specified. In the acyls, alkyl or aryl are as defined herein. Examples of acyl comprise, but are not limited to: acetyl, propionyl, isobutyryl, benzoyl, etc.

"Acylamino" comprises (alkyl-CONH)— and (aryl-CONH)—, unless otherwise specified, wherein, the alkyl or aryl are as defined herein. Examples of amido comprise, but are not limited to: acetamido, propionamido, butyramido, isobutyramido, benzamido, etc.

"Alkenyl" when used as a group or a moiety of a group refers to an aliphatic hydrocarbon group containing at least one carbon-carbon double bond, which can be a straight or branched chain. Preferably $C_2$-$C_{14}$ alkenyls, more preferably $C_2$-$C_{12}$ alkenyls; most preferably $C_2$-$C_6$ alkenyls. The group may contain multiple double bonds in the main chain of the group and the conformation for each of the group may be E or Z. Examples of alkenyl comprise but are not limited to: vinyl, propenyl, etc.

"Alkyloxy" refers to (alkyl-O)—, wherein, the alkyl is as defined herein. Preferably, $C_1$-$C_6$ alkyloxys. Examples comprise, but are not limited to: methoxy, ethoxy, n-propoxy, isopropoxy, n-butoxy, isobutoxy, etc.

"Alkenyloxy" refers to (alkenyl-O)—, wherein, the alkenyl is as defined herein. $C_1$-$C_6$ alkenyloxys are preferred.

"Alkynyloxy" refers to (alkynyl-O)—, wherein, the alkynyl is as defined herein. $C_1$-$C_6$ alkynyloxys are preferred.

"Alkoxycarbonyl" refers to (alkyl-O—C(O))—, wherein, the alkyl is as defined herein. Preferably, the alkyl groups are $C_1$-$C_6$ alkyls. Examples comprise, but are not limited to: methoxycarbonyl, ethoxycarbonyl etc.

"Alkylsulfinyl" refers to (alkyl-S(O))—, wherein, the alkyl is as defined herein. Preferably, the alkyl is a $C_1$-$C_6$ alkyl group. An alkylsulfinyl group comprises, but are not limited to: methylsulfinyl, ethylsulfinyl, etc.

"Alkylsulfonyl" refers to (alkyl-S(O)$_2$—O)—, wherein, the alkyl is as defined herein. Preferably, the alkyl is a $C_1$-$C_6$ alkyl group. Examples comprise, but are not limited to: methylsulfonyl, ethylsulfonyl, etc.

"Alkylamino carbonyl" refers to an alkylamino-carbonyl group, wherein, the alkylamino is as defined herein.

"Cycloalkyl" refers to a saturated or partially saturated monocyclic, fused or spirocyclic carbon ring. Preferably, s ring consisting of 3-9 (e.g., 3, 4, 5, 6, 7, 8 or 9) carbon atoms. Examples comprise, but are not limited to: cyclopropyl, cyclobutyl, cyclopentyl, cyclohexyl, etc.

"Cycloalkylalkyl" refers to a cycloalkyl-alkyl group, wherein, thecycloalkyl and alkyl moieties are as defined herein. Monocyclic alkylalkyl groups comprise, but are not limited to: cyclopropylmethyl, cyclopentylmethyl, cyclohexylmethyl, cyclohexylmethyl, cycloheptylmethyl, etc.

"Heterocycloalkyl" refers to a cycloalkyl containing at least one heteroatom selected from N, S, O. Preferably, the heterocycloalkyl contains 1, 2 or 3 heteroatoms. Preferred rings are 3-14 membered rings, more preferred rings are 4-7 membered ring. Heterocycloalkyl comprises but is not limited to: pyrrolidyl, dihydropyrrolyl, tetrahydropyrrolyl, dihydropyrazolyl, piperidinyl, morpholinyltetrahydrofuryl, tetrahydrothiofuryl, tetrahydropyranyl, etc.

"Heterocycloalkenyl" refers to a heterocycloalkyl containing at least one double bond. For the definition of heterocycloalkyl, eee the relevant definitions herein.

"Heterocycloalkylalkyl" refers to: (heterocycloalkyl-alkyl)-, wherein, the heterocycloalkyl and alkyl are as defined herein. Heterocycloalkylalkyl groups comprise, but are not limited to: (2-tetrahydrofuryl)methyl, (2-tetrahydrothiofuryl)methyl, etc.

"Heteroalkyl" means a straight or branched chain alkyl group containing at least one or more (e.g., 1, 2, 3 or 4) heteroatoms selected from S, O and N in the main chain. Heteroalkyl preferably contains 2-14 (e.g., 2, 3, 4, 5, 6, 7, 8, 9, 10, 11 or 12) atomic chains. Heteroalkyl comprises, but are not limited to: ethers, thioethers, alkyl esters, the secondary or tertiary alkyl amines, alkyl sulfinic acids, etc.

"Aryl" as a group or a moiety of a group refers to: (1) an aromatic monocyclic or fused ring, preferably an aromatic carbon ring with 5-12 (e.g., 5, 6, 7, 8, 9, 10, 11 or 12) carbon atoms (in the ring structures, the ring atoms are all carbons). Examples of aryl comprise, but are not limited to: phenyl, naphthyl, (2) partially saturated carbon rings can be attached, such as: phenyl and $C_{5-7}$ cycloalkyls or $C_{5-7}$ cycloalkenyls are fused to each other to form a cyclic structure. Examples comprise, but are not limited to: tetrahydronaphthyl, indenyl or indanyl, etc. The aryl group can be substituted by one or more substituents.

"Arylalkenyl" refers to a (aryl-alkenyl)-, wherein, the aryl and alkenyl are as defined herein. Exemplary arylalkenyl groups comprise, but are not limited to: phenylpropenyl and the like.

"Aralkyl" refers to a (aryl-alkyl)-, wherein, the aryl and alkyl moieties are as defined herein. Exemplary arylalkyl groups comprise, but are not limited to: benzyl, phenethyl, 1-menaphthyl, etc.

"Cycloalkenyl" refers to a non-aromatic monocyclic or polycyclic ring system. Cycloalkenyl contains at least one carbon-carbon double bond and preferably each ring has 5-10 (e.g. 5, 6, 7, 8, 9, 10) carbon atoms. Exemplary monocyclic cycloalkenyl rings comprise, but are not limited to: cyclopentenyl, cyclohexenyl or cycloheptenyl. Cycloalkene groups may be substituted with one or more substituents.

"Heteroaryl" refers to a monocyclic or fused polycyclic aromatic heterocycle. Preferably a 5-, 6- or 7-membered aromatic ring containing one or more (e.g., 1, 2, 3 or 4) heteroatoms selected from N, O or/and S. Typical heteroaryl substituents comprise but are not limited to the following examples: furyl, thienyl, pyrrolyl, pyrazolyl, triazolyl, thiazolyl, pyridyl, pyrimidyl, pyrazinyl, indolyl, benzimidazolyl etc.

"Heteroarylalkyl" refers to a (heteroaryl-alkyl)-, wherein, the heteroaryl and alkyl moieties are as defined herein. Exemplary heteroarylalkyl groups comprise, but are not limited to: 2-furylmethyl, 3-furylmethyl, 2-pyridylmethyl, etc.

The present invention comprises the compounds of general formula (I) and possible isomers of the compounds, comprising diastereoisomer, enantiomer, tautomers and geometric isomers of "E" or "Z" configuration isomers, etc. Any practitioner in the field of chemistry with some basic knowledge can isolate the above optically pure or stereoisomerically pure compounds.

The present invention comprises compounds of general formula (I) and mixtures of possible racemates and/or enantiomers and/or diastereomers.

In addition, compounds of general formula (I) also comprise solvates and non-solvated forms of the compounds in application. Therefore, each said formula comprises compounds of the indicated structures as well as hydrates and anhydrous forms of the compounds.

As used herein, the term "pharmaceutically acceptable salt" means, within the scope of reliable medical judgment, salts that are suitable to contact with human and lower animal tissues without excess toxicity, irritation, allergy, etc., and salts that are commensurate with reasonable benefits/risks ratio. Pharmaceutically acceptable salts are well known in the art. For example, Berge et al. describe pharmaceutically acceptable salts in detail in J. Pharmaceutical Sciences (1977) 66: 1-19. Pharmaceutically acceptable salts of the compounds of the present invention comprise salts derived from suitable inorganic and organic acids and bases. Examples of pharmaceutically acceptable non-toxic acid addition salts are those formed with inorganic acids such as hydrochloric, hydrobromic, phosphoric, sulfuric and perchloric acids, or salts formed with organic acids such as acetic acid, oxalic acid, maleic acid, tartaric acid, citric acid, succinic acid or malonic acid. Salts prepared by common method in the art, such as ion-exchange are also included. Other pharmaceutically acceptable salts comprise: adipates, alginates, ascorbates, aspartates, besylates, benzoates, bisulfates, borates, butyrates, camphorates, camphorsulfonate, citrate, cypionate, digluconate, dodecyl sulfate, ethanesulfonate, formate, fumarate, gluconate, glycerophosphate, gluconate, hemisulfate, heptanoate, hexanoate, hydriodate, 2-hydroxyl-ethanesulfonate, lactobionate, lactate, laurate, lauryl sulfate, malate, maleate, malonate, mesylate, 2-naphthalenesulfonate, nicotinate, nitrate, oleate, oxalate, palmitate, pamoate, pectate, persulfate, 3-phenylpropionate, phosphate, picrate, pivalate, propionate, stearate, succinate, sulfate, tartrate, thiocyanate, p-toluenesulfonate, undecanoate, valerate, etc. Pharmaceutically acceptable salts derived from suitable bases include alkali metal, alkaline earth metal, ammonium and $N^*(C_{1-4}alkyl)_4$ salts. Exemplary alkali metal or alkali earth metal salts include sodium, lithium, potassium, calcium, magnesium salts, etc. Other pharmaceutically acceptable salts comprise, where appropriate, non-toxic ammonium, quaternary ammonium and amine cations that are formed with counter ions, the counter ions are for example halide ions, hydroxyl, carboxylate, sulfates, phosphates, nitrates, lower alkyl sulfonates and aryl sulfonates.

The term "solvate" refers to a complex with a specific ratio formed by a compound of the present invention coordinated with a solvent molecule. "Hydrate" refers to a complex formed by the coordination of a compound of the present invention with water.

The compounds of the present invention may contain one or more asymmetric centers, and thus may exist in various "stereoisomer", e.g., enantiomers and/or diastereomers. For example, the compound of the present invention may be an individual enantiomer, diastereomer, or geometric isomer (e.g., cis and trans isomers), or may be in the form of a mixture of stereoisomers, comprising racemic mixtures and mixtures enriched in one or more stereoisomers. Isomers can be separated from mixtures by methods known to those skilled in the art, comprising chiral high pressure liquid chromatography (HPLC) and chiral salt formation and crystallization; or preferred isomers can be prepared by asymmetric synthesis.

The pharmacological effects of the present invention are described below.

The PPARδ activation effect of the compounds of the present invention was determined as follows (measurement of the PPAR activation effect of the test compounds (compounds in the examples)).

The receptor expression plasmid (pSG5-GAL4-hPPARα or γ or δ (LBD)), luciferase expression plasmid (pUC8-MH100×4-TK-Luc) and β-galactosidase expression plasmid (pCMX-β-GAL) (Kliewer, S. A. et. al., (1992) Nature, 358:771-774) were introduced into CV-1 cells (ATCC).

After gene introduction using the lipofection reagent DMRIE-C or Lipofectamin 2000 (Invitrogen), the cells were cultured in the presence of the test compound for 42 hours. Lysed cells were tested for luciferase activity and β-GAL activity. The luciferase activity was corrected by β-GAL activity, and the relative ligand activities of each of PPARα, γ, and δ were calculated as follows: the relative ligand activity of PPARα was calculated using the luciferase activity value of cells treated with GW-590735 (PPARα selective agonist) as 100%; the relative ligand activity of PPARγ was calculated using the luciferase activity value of cells treated with Rosiglitazone as 100%; the relative ligand activity of PPARδ was calculated using the luciferase activity value of cells treated with GW-501516 as 100%.

The term "prodrug" comprises compounds which may be biologically active or inactive themselves. When administered in an appropriate manner, prodrugs undergo a metabolic or chemical reaction in the human body to convert into compounds of formula (I), or a salt or solution formed by a compound of formula (I). The prodrugs comprise (but are not limited to) carboxylate, carbonate, phosphate, nitrate, sulfate, sulfone, sulfoxide, amino compounds, carbamates, azo compounds, phosphamide, glucoside, ether, acetal and other forms of the compound.

As used herein, the term "subject" comprises, but is not limited to, humans (i.e., male or female of any age group, e.g., pediatric subjects (e.g., infants, children, adolescents) or adult subjects (e.g., young adults, middle-aged adults, or older adults)) and/or non-human animals, e.g., mammals, e.g., primates (e.g., machin, rhesus monkeys), cows, pigs, horses, sheep, goats, rodents, cats and/or dogs. In some embodiments, the subject is a human. In other embodiments, the subject is a non-human animal.

Unless otherwise specified, the term "treatment", as used herein, includes the effect that occurs when a subject suffers from a particular disease, disorder or condition. Treatment reduces the severity of the disease, disorder or condition, or delays or slows down the development of the disease, disorder or condition ("therapeutic treatment"), and also includes effects that occur before a subject begins to suffer from a particular disease, disorder, or disease ("prophylactic treatment").

"Combination" and related terms refer to the simultaneous or sequential administration of the therapeutic agents of the present invention. For example, a compound of the present invention may be administered concurrently or sequentially with another therapeutic agent in separate unit dosage forms, or concurrently with another therapeutic agent in a single unit dosage form.

"Pharmaceutically acceptable excipient" refers to a non-toxic carrier, adjuvant or vehicle that does not destroy the pharmacological activity of the compound formulated together. Pharmaceutically acceptable carriers, adjuvants or vehicles that can be used in the compositions of the present invention comprise (but are not limited to) ion exchangers, alumina, aluminum stearate, lecithin, serum proteins such as (human serum albumin), buffers (such as phosphates), glycine, sorbic acid, potassium sorbate, mixtures of partial glycerides of saturated vegetable fatty acids, water, salts or electrolytes (such as protamine sulfate), disodium hydrogen phosphate, potassium hydrogen phosphate, sodium chloride, zinc salts, silica gel, magnesium trisilicate, polyvinylpyrrolidone, cellulose-based substances, polyethylene glycol, sodium carboxymethylcellulose, polyacrylate, wax, polyethylene-polyoxypropylene-block segment polymers, polyethylene glycol, and lanolin.

The ways of administration of the compounds or pharmaceutical compositions of the present invention are not particularly limited, and representative ways of administration comprise, but are not limited to: oral, duodenal, rectal, parenteral (intravenous, intramuscular or subcutaneous) and topical administration.

Solid formulations for oral administration comprise capsules, tablets, pills and granules. In these solid formulations, the active compound is mixed with at least one conventional inert excipient (or carrier), such as sodium citrate or dicalcium phosphate, or with the following components: (a) fillers or solubilizers, for example, starch, lactose, sucrose, glucose, mannitol and silicic acid; (b) binders, for example, hydroxymethyl cellulose, alginate, gelatin, polyvinylpyrrolidone, sucrose and acacia; (c) humectants, for example, glycerol; (d) disintegrants, for example, agar, calcium carbonate, potato or tapioca starch, alginic acid, certain complex silicates, and sodium carbonate; (e) slow solvents, for example, paraffin; (f) absorption accelerators, e.g., quaternary amine compounds; (g) wetting agents, e.g., cetyl alcohol and glyceryl monostearate; (h) adsorbents, e.g., kaolin; and (i) lubricants, e.g., talc, calcium stearate, magnesium stearate, solid polyethylene glycol, sodium lauryl sulfate, or mixtures of the above components. In capsules, tablets and pills, the formulation may also contain buffering agents.

Solid formulations such as tablets, rotulas, capsules, pills and granules can be prepared with coatings and shell materials, such as enteric coatings and other materials well known in the art. They may contain opacifying agents, and the release of the active compound or compounds in such compositions may be occurred in a certain part of the digestive tract in a delayed manner. Examples of embedding components that can be employed are polymeric substances and waxes. The active compound may also forms a microcapsule with one or more of the above-mentioned excipients when necessary.

Liquid formulations for oral administration comprise pharmaceutically acceptable emulsions, solutions, suspensions, syrups or tinctures. In addition to the active compound, liquid formulations may contain inert release agents conventionally employed in the art, such as water or other solvents, solubilizers and emulsifiers, for example, ethanol, isopropanol, ethyl carbonate, ethyl acetate, propylene glycol, 1, 3-butanediol, dimethylformamide and oils, especially cottonseed oil, peanut oil, corn germ oil, olive oil, castor oil and sesame oil or mixtures of these substances.

The present invention provides a method of treating conditions related to a disease mediated by PPARα and/or PPARδ in a subject in need thereof, comprising the steps of administering to the subject in need thereof a compound of the present invention, or a pharmaceutically acceptable salt, stereoisomer, solvate, hydrate, crystal form, prodrug or isotopic derivative of the compound, or administering the pharmaceutical composition of the present invention.

The compounds of the present invention can be used to treat disease mediated by PPARα and/or PPARδ, the disease is selected from: any acute or chronic liver disease involving pathological destruction, inflammation, degeneration and/or proliferation of liver cells, complications associated with metabolic syndrome, insulin resistance, diabetes, dyslipidemia, atherosclerosis, cardiovascular disease, obesity, hypertension, inflammatory disease, fibrotic disease, neurodegeneration disease or cancer.

Fibrotic diseases that can be treated by the compounds of the present invention include, but are not limited to: pulmonary fibrosis, idiopathic pulmonary fibrosis, cystic fibrosis, endomyocardial fibrosis, mediastinal fibrosis, myelofibrosis, retroperitoneal fibrosis, progressive massive fibrosis, nephrogenic systemic fibrosis, Crohn's disease, old myocardial infarction, scleroderma/systemic sclerosis, joint fibrosis, or adhesive capsulitis.

The compounds of the present invention can treat diseases mediated by PPARδ, the diseases comprise but are not limited to: hyperlipidemia, dyslipidemia, hyperchlolesterolemia, hypertriglyceridemia, HDL hypocholesterolemia, LDL hypercholesterolemia and/or HLD non-cholesterolemia, VLDL hyperproteinemia, dyslipoproteinemia, apolipoprotein A-I hypoproteinemia, disease of arterial sclerosis, disease of cardiovascular systems, cerebrovascular disease, peripheral circulatory disease, metabolic syndrome, syndrome X, obesity, diabetes, hyperglycemia, insulin resistance, impaired glucose tolerance, hyperinsulinism, diabetic complication, cardiac insufficiency, cardiac infarction, cardio myopathy, hypertension, fatty liver, non-alcoholic fatty hepatitis, thrombus, Alzheimer disease, neurodegenerative, demyelinating disease, multiple sclerosis, adrenal leukodystrophy, dermatitis, psoriasis, acne, skin aging, trichosis, inflammation, asthma, hyper sensitive intestine syndrome, ulcerative colitis, Crohn's disease, pancreatitis, or cancer including colon cancer, large intestine cancer, skin cancer, breast cancer, prostate cancer, ovary cancer, and lung cancer.

Cancers that can be treated by the compounds of the present invention comprise, but are not limited to: renal cell carcinoma, gastrointestinal stromal tumor (GIST), gastric cancer, liver cancer, neurofibromatosis-related meningiomas, pancreatic neuroendocrine tumors, pancreatic exocrine tumors, leukemia, myeloproliferative/myelodysplastic disease, mastocytosis, dermatofibrosarcoma, solid cancer including breast, lung, thyroid or colorectal cancer, or prostate cancer.

Synthesis of Substituted Benzimidazole Derivates

The compounds represented by formula (I) can be prepared by the synthesis route and method discussed below. The starting materials can be easily obtained. However, the synthesis route and the methods of the present invention can be widely used in preparing analogues. The preparation of analogues can be achieved by solely changing the starting materials. For example, although detailed description of the synthesis of the compound are not provided in the examples herein, target compound that are needed can be synthesized by changing the starting materials to the ones corresponding to the target compound, then based on common knowledge of chemistry, modifying the reaction conditions if necessary.

Agents of individual embodiment can be used, indicating that the preparation can be carried out via the reaction route or synthesis flow charts described below, using the techniques available in the art and starting materials available.

The preparation of a specific compound in an embodiment was detailed in the following examples, while those skilled in the art can understood that the mentioned chemical reactions can be used for preparing other agents in different embodiments, e.g., synthesis of an compound outside the examples can be carried out successfully by a skilled person in the art with obvious modifications, such as by properly protecting interfering functional group, by using other appropriate agents in the art or by conventional modifications of reaction conditions. For tables of suitable protective groups used in organic synthesis, please refer to Protective Groups in Organic Synthesis, Wiley, 2007 by G. M. Peter. Other reactions that are disclosed herein or known in the art can be considered to be suitable for preparing other compounds in each embodiment.

Agents that are useful for preparing the compounds can be obtained or prepared by known techniques in the art.

In the following examples, all the temperatures are in degrees Celsius, unless specified otherwise.

All kinds of staring materials and agents were commercially available. Suppliers include, but are not limited to Aldrich Chemical Company, Lancaster Synthesis Ltd, etc. Commercially available starting materials and agents were used without further purification unless specified otherwise.

Glassware was dried in an oven or by heating. Reactions were monitored on glass silicone-60 F254 plates (0.25 mm) (TLC). Analytical thin-layer chromatography was carried out with appropriate solvent ratios (v/v). Reaction endpoints were marked when the starting materials on TLC were exhausted. (J. Org. Chem., Vol. 43, No. 14, 1978 2923-2925).

Generally, the follow-up treatment was to double the volume of the reaction solution using the solvent used for the reaction, and then performed three extractions with an extraction solvent that is 25% of the total volume, unless otherwise specified. The product-containing part was extracted and was dehydrated over anhydrous sodium sulfate, then was filtered on a rotary evaporator. The solvent was evaporated under reduced pressure, the solvent was removed under vacuum carefully. Finally, the target compound was obtained by rapid column chromatography separation (J. Org. Chem., 1978; 43:2923).

$^1$H NMR spectra were obtained with a Bruker instrument (200-400 MHz) and chemical shifts were expressed in ppm. Chloroform was used as reference standard (7.25 ppm) or tetramethylsilane internal standard (0.00 ppm). Other solvents that are commonly used for NMR can also be used when necessary. The $^1$H NMR is expressed as: s=singlet, d=doublet, t=triplet, m=multiplet, br=broadened, dd=doublet of doublet, dt=doublet of triplet. When coupling constants are provided, they are in Hz.

Mass spectrum is obtained by LC/MS instrument, and the ionization mode can be ESI or APCI. All melting points are not corrected.

The following examples are merely intended to illustrate the synthesis of the specific compounds of the invention, but they do not constitute any limitations on the synthesis method. Compounds that are not listed below can also be prepared by using the same synthesis route and synthesis method as below, and by selecting appropriate starting materials and adjusting reaction conditions with appropriate common sense where necessary.

Synthesis

In formula (I), when $R^1$=$C_5$—Br, $R^3$=H, $R^4$=$C_2$-ethyl, the corresponding compound XVI can be prepared by a method shown in scheme 1. For example, when X=bond and Y=O, S, the compound of formula (I) can be prepared using 4-bromo-2-ethyl phenol as the starting material, incorporating formyl carboxyl while catalyzed by palladium on carbon, subjecting to reduction and condensation to obtain compound VI. Suitable compound 1-fluoro-4-substituted-2-nitrobenzene VII and suitable compound VIII were condensed to obtain compound IX, and after reduction, acylation, cyclization, deprotection, compound XIV was obtained. Compound XIV was condensed with suitable compound V, then was hydrolyzed to obtain the target compound XVI.

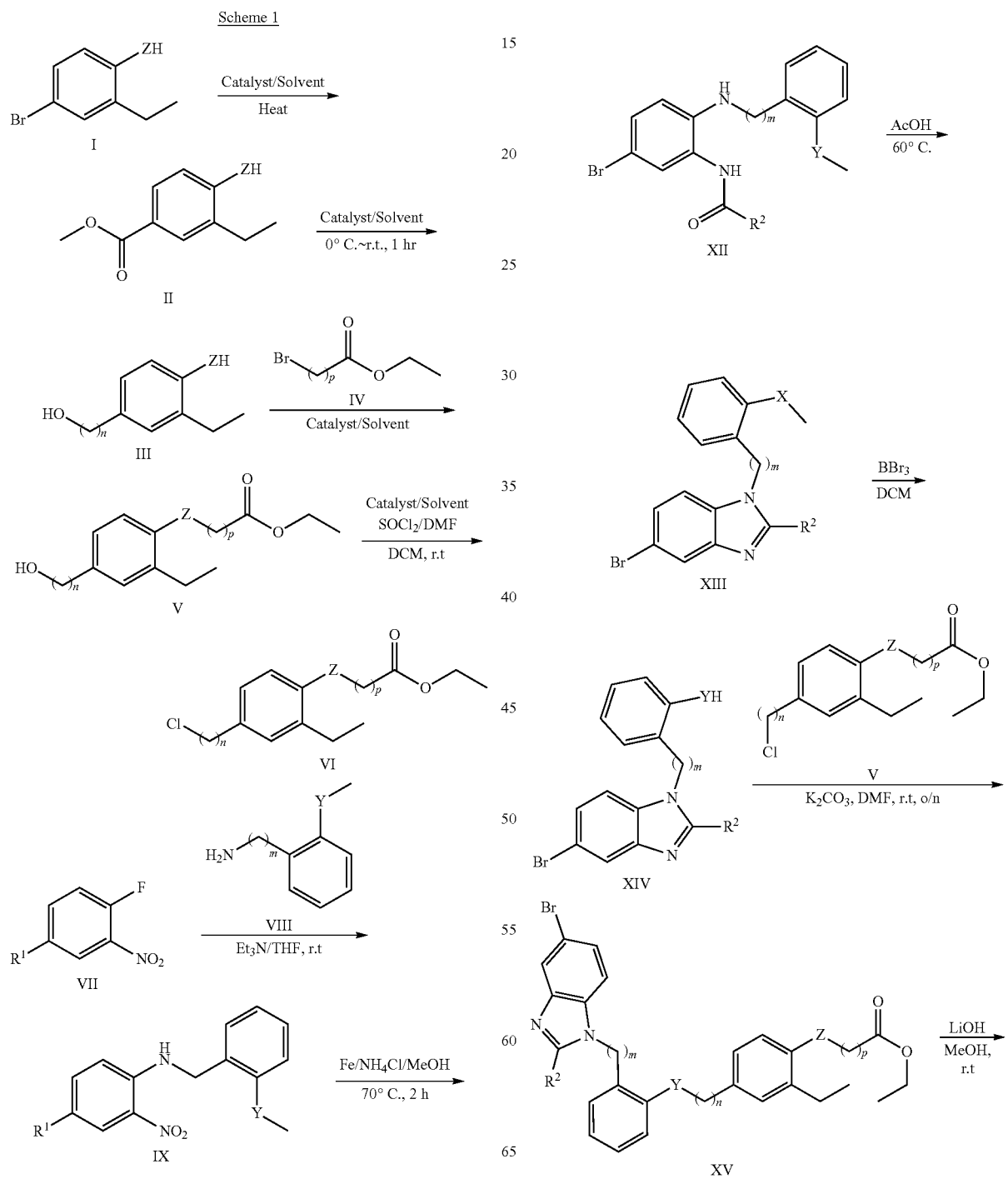

-continued

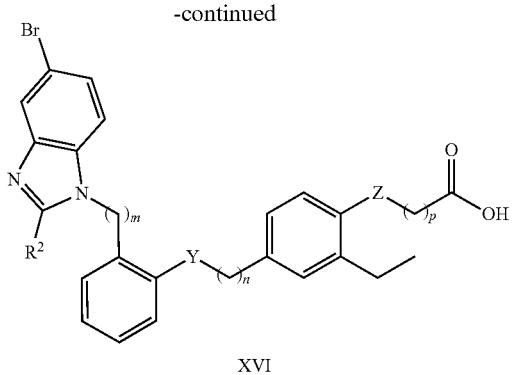

XVI

Specifically, when $R^1=C_5-Br$, $R^3=H$, $R^4=C_2$-ethyl, the target compound (XVI) of formula (I), can be prepared by a method shown in scheme 1. For example, when X=bond and Y, Z=O, S, 4-bromo-2-ethyl phenol can be used as the starting material. Formyl carboxyl can be incorporated under the catalysis of palladium on carbon to obtain compound II. Under the reduction by LAH, a hydroxy derivative III was obtained. A selective condensed compound V was obtained under the catalysis of a suitable base by the derivative III and a suitable bromoderivative IV. Then, after chlorination, compound VI was obtained. Meanwhile, under the catalysis of a suitable base, a suitable compound 1-fluoro-4-substituted-2-nitrobenzene VII was selected and condensed with a corresponding compound VIII to obtained compound IX. Compound X was obtained by a reduction of the compound IX under the action of a suitable reductant. Under the action of a suitable common condensing agent and compound XI, compound XI then reacted with compound X to obtain compound XII. Compound XII was obtained by acidic cyclization under heating conditions. Compound XIII was converted to compound XIV using dichloromethane as the solvent and after the treatment of $BBr_3$. Compound V was condensed with Compound XIV using dichloromethane as the solvent, under the catalysis of a suitable base. The obtained compound XV was hydrolyzed to obtain the target compound XVI.

In formula (I), when $R^3=H$, $R^4=C_2$-ethyl, the corresponding target compound XXXV can be prepared by a method shown in scheme 2. For example, when X, Y=bond and Z=O, S, the compound represented by formula (I) can be used to prepare compound XX by using 4-bromo-2-ethyliodobenzen as the starting material, incorporating formyl carboxyl under catalysis, then subjecting to condensation and reduction. With suitable borene reagent, under the catalysis of palladium, alkenyl was introduced to obtain compound XXI. The compound XXI was oxidized, reduced, chlorinated to give XXIV. On the other hand, 1-fluoro-2-nitro-substituted benzene derivative XXV was aminated and reduced to obtain compound XXVIII. Under the action of a suitable condensing agent, the corresponding compound XXIX was incorporated into XXVIII, to obtain XXX. The XXX was cyclized under acidic conditions, then was deprotected under catalysis to obtain XXXII. Suitable compound XXXIII was chosen to condense with compound XXXII, then hydrolyzed under alkaline condition, to obtain the target compound XXXV as needed.

Scheme 2

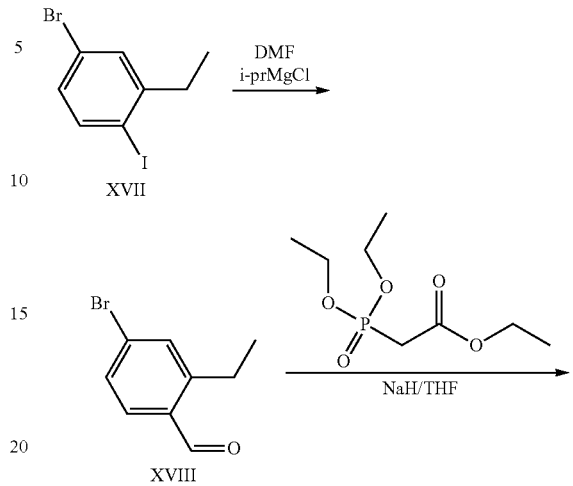

XVII

XVIII

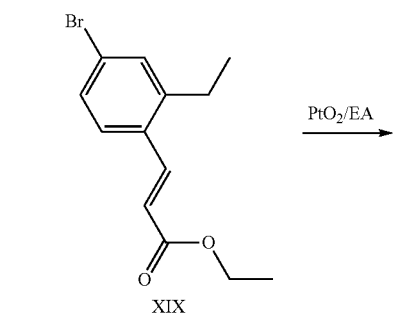

XIX

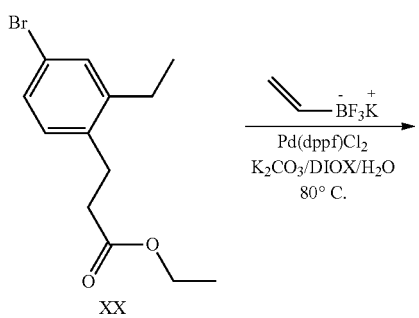

XX

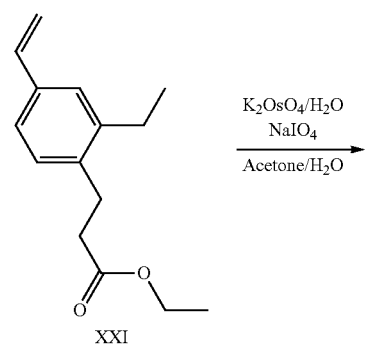

XXI

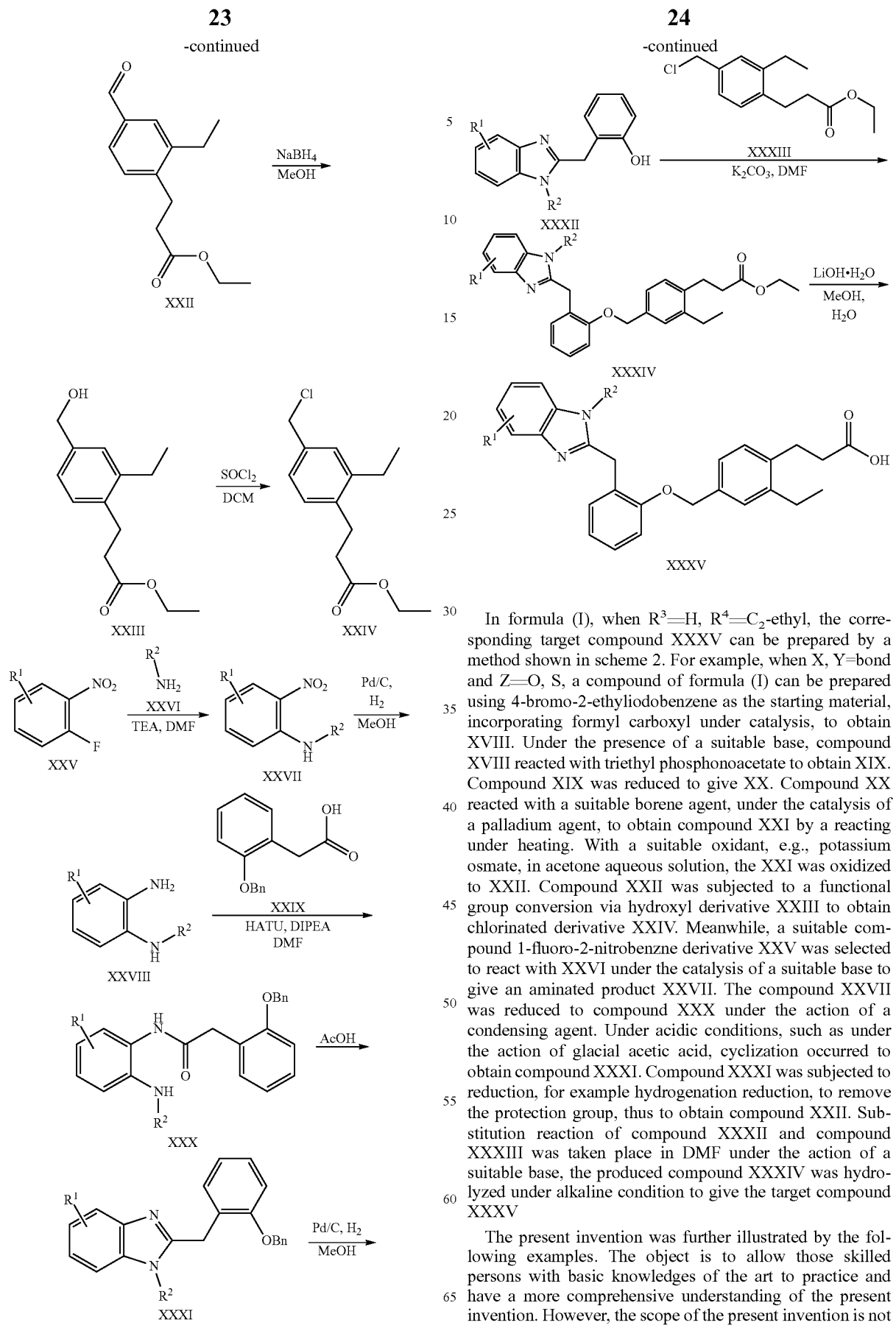

In formula (I), when $R^3$=H, $R^4$=$C_2$-ethyl, the corresponding target compound XXXV can be prepared by a method shown in scheme 2. For example, when X, Y=bond and Z=O, S, a compound of formula (I) can be prepared using 4-bromo-2-ethyliodobenzene as the starting material, incorporating formyl carboxyl under catalysis, to obtain XVIII. Under the presence of a suitable base, compound XVIII reacted with triethyl phosphonoacetate to obtain XIX. Compound XIX was reduced to give XX. Compound XX reacted with a suitable borene agent, under the catalysis of a palladium agent, to obtain compound XXI by a reacting under heating. With a suitable oxidant, e.g., potassium osmate, in acetone aqueous solution, the XXI was oxidized to XXII. Compound XXII was subjected to a functional group conversion via hydroxyl derivative XXIII to obtain chlorinated derivative XXIV. Meanwhile, a suitable compound 1-fluoro-2-nitrobenzne derivative XXV was selected to react with XXVI under the catalysis of a suitable base to give an aminated product XXVII. The compound XXVII was reduced to compound XXX under the action of a condensing agent. Under acidic conditions, such as under the action of glacial acetic acid, cyclization occurred to obtain compound XXXI. Compound XXXI was subjected to reduction, for example hydrogenation reduction, to remove the protection group, thus to obtain compound XXII. Substitution reaction of compound XXXII and compound XXXIII was taken place in DMF under the action of a suitable base, the produced compound XXXIV was hydrolyzed under alkaline condition to give the target compound XXXV The present invention was further illustrated by the following examples. The object is to allow those skilled persons with basic knowledges of the art to practice and have a more comprehensive understanding of the present invention. However, the scope of the present invention is not limited by these examples.

EXAMPLE 1
Preparation of 2-(4-((2-((5-bromo-2-ethyl-1H-benzo[d]imidazol-1-yl)methyl)phenoxy)methyl)-2-ethylphenoxy) acetic acid (1)
Compound 1 of example 1 can be prepared by the method of the above scheme 1 or the method of scheme 2. Specifically, by choosing the starting materials as needed, the compound can be synthesized by the specific route represented as follows.
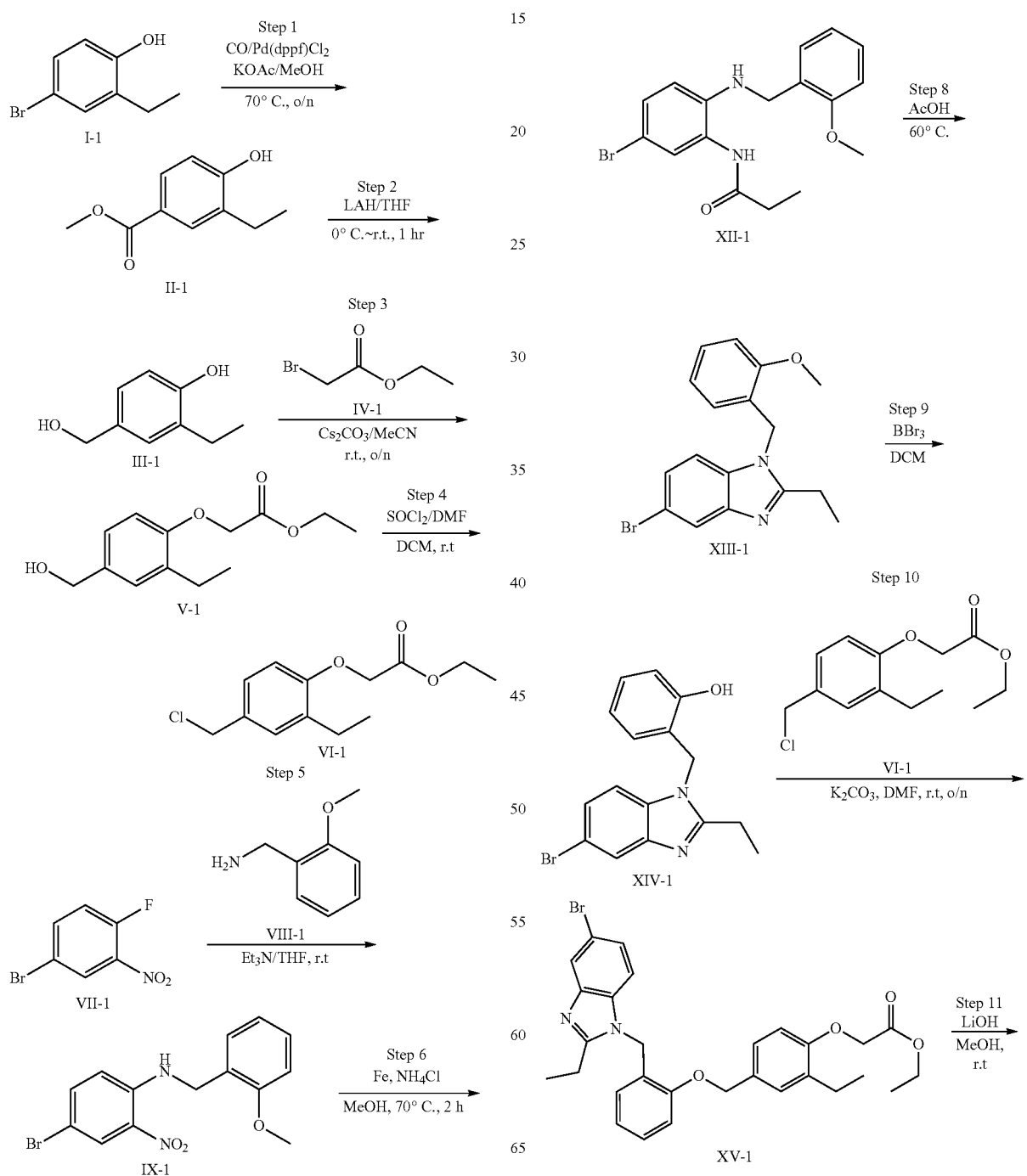

-continued

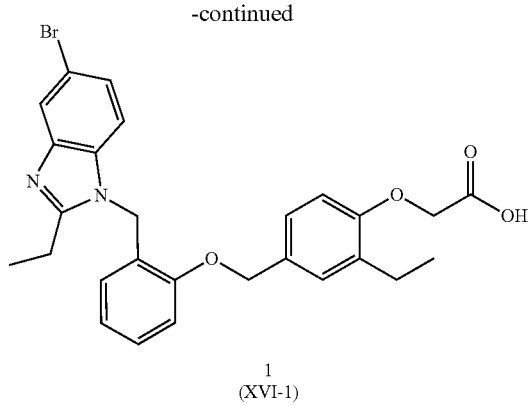

1
(XVI-1)

Step 1. Synthesis of methyl 3-ethyl-4-hydroxylbenzoate (1T-1)

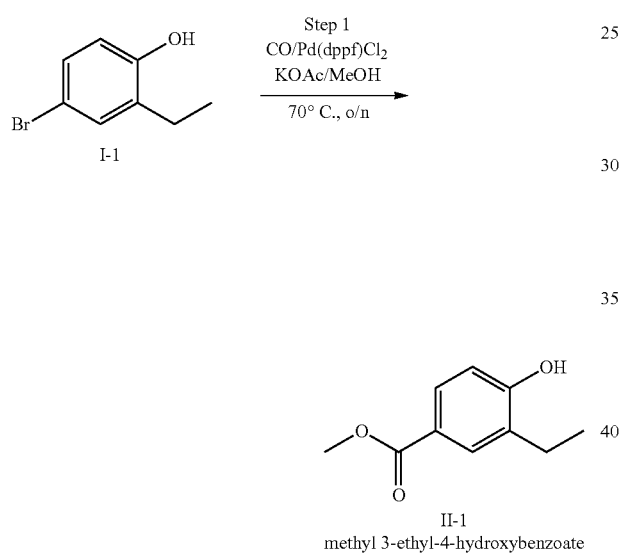

II-1
methyl 3-ethyl-4-hydroxybenzoate

In a reaction flask, I-1 (40.0 g, 0.2 mol), Pd(dppf)Cl$_2$ (14.6 g, 0.02 mol), potassium acetate (58.8 g, 0.6 mol) and methanol (200.0 mL) were added sequentially, and the air was replaced using carbon monoxide balloon for 3 times, the contents in the flask were stirred overnight in the CO atmosphere at 70° C. After the reaction was complete, the solvent was evaporated under reduced pressure. The reaction mixture was added into water (100.0 mL), then extracted with ethyl acetate (150.0 mL×3). The organic phases were washed with saturated salt water, dried with anhydrous sodium sulfate. The solvent was evaporated under reduced pressure to obtain a crude product. The crude product was subjected to silica gel column purification [eluent: petroleum ether-ethyl acetate (1:2)]. The eluant was collected. The solvent was evaporated under reduced pressure to obtain a yellow solid II-1 (18.0 g, yield:50.0%). $^1$H NMR (400 MHz, CDCl$_3$) δ: 7.85 (d, J=2.0 Hz, 1H), 7.80 (dd, J=10.4, 6.4 Hz, 1H), 6.78 (d, J=8.4 Hz, 1H), 5.41 (s, 1H), 3.87 (s, 3H), 2.68 (q, J=7.6 Hz, 2H), 1.26 (t, J=7.6 Hz, 3H).

Step 2. Synthesis of 2-ethyl-4-(hydroxymethyl)phenol (III-1)

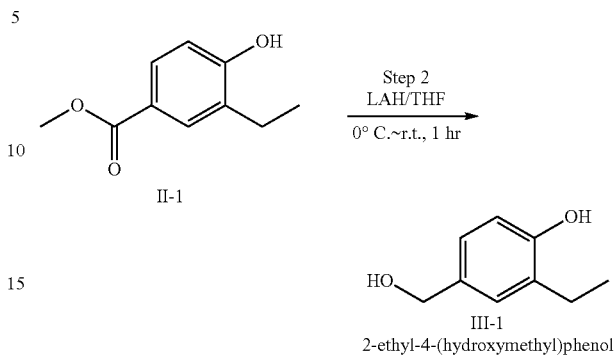

III-1
2-ethyl-4-(hydroxymethyl)phenol

In a reaction flask, II-1 (15.0 g, 83.3 mmol) and dried tetrahydrofuran (200.0 mL) were added, and stirred under nitrogen gas protection, then cooled to 0° C. in an ice bath. Lithium aluminum hydride (3.8 g, 99.9 mmol) was added slowly in batches. The temperature was kept at 0° C. After the addition was completed, the materials were stirred for 1h at 0° C. Water (15.0 mL), 15% sodium hydroxide (15.0 mL) and water (30.0 mL) were dropwise added into the reaction slowly and sequentially. The temperature was kept at 0° C. After the addition was completed, the temperature was increased to room temperature and the system was kept stirring for 1 hour, then was filtered. The filtrate was collected and dried with anhydrous sodium sulfate, then was filtered again, and the filtrate was collected. The solvent was evaporated under reduced pressure to obtain white solid III-1 (8.0 g, yield: 63.1%). $^1$H NMR (400 MHz, CDCl$_3$) δ: 7.16 (d, J=2.0 Hz, 1H), 7.10 (dd, J=10.4, 6.0 Hz, 1H), 6.76 (d, J=8.0 Hz, 1H), 4.81 (s, 1H), 4.61 (d, J=5.6 Hz, 2H), 2.67 (q, J=7.6 Hz, 2H), 1.26 (t, J=4.8 Hz, 3H).

Step 3. Synthesis of ethyl 2-(2-ethyl-4-(hydroxymethyl)phenoxy acetate (III-1)

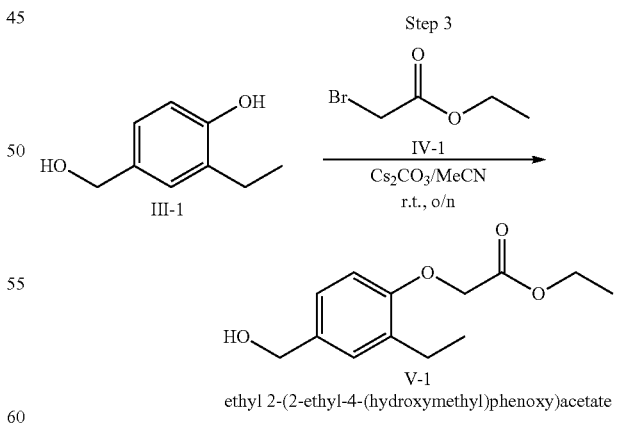

V-1
ethyl 2-(2-ethyl-4-(hydroxymethyl)phenoxy)acetate

In a reaction flask, III-1 (8.0 g, 52.6 mmol), ethyl bromoacetate (10.6 g, 63.2 mmol, IV-A), and cesium carbonate (25.7 g, 78.9 mmol) and acetonitrile (100.0 mL) were added sequentially, stirred overnight at room temperature. After the reaction was completed, the solvent was evaporated under reduced pressure. Water (50.0 mL) was added, and the obtained system was extracted by ethyl acetate (100.0 mL×3). Then the organic phases were washed by saturated salt water and dried with anhydrous sodium sulfate. The solvent was evaporated under reduced pressure to obtain a crude product. The crude product was subjected to silica gel column purification [eluent: petroleum ether-ethyl acetate (1:2)], then the eluant was collected and the solvent was evaporated under reduced pressure to obtain an off-white solid V-1 (7.5 g, yield:60.00%). LCMS (method B) purity: 90.75%, Rt=1.86 min; MS measurement: 238.1; MS measurement: 221.4 [M-17].

Step 4. Synthesis of ethyl 2-(4-(chloromethyl)-2-ethylphenoxy) acetate (VI-1)

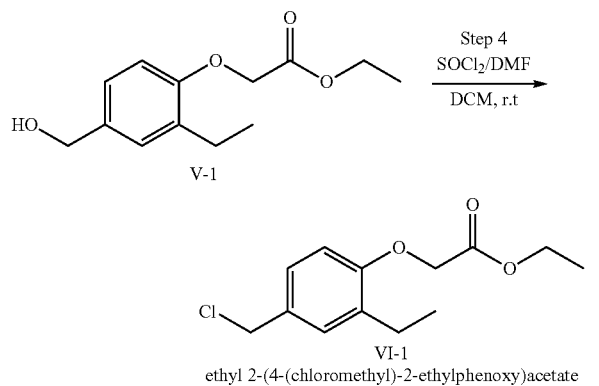

In a reaction flask, V-1 (100 mg, 0.42 mmol), N,N-dimethylformamide (2 drops) and dry dichloromethane (4.0 mL) were added, then cooled to 0° C. in an ice bath under stirring. Thionyl chloride (150 mg, 1.26 mmol) was dropwise added thereto slowly. After the addition was completed, the mixture was stirred for 2 hours at room temperature. After the reaction was completed, the solvent was evaporated under reduced pressure to obtain a yellow solid VI-1 (122 mg, yield:100.0%).

LCMS (method A) purity: 91.98%, Rt=0.83 min; MS measurement: 256.1; measurement: 257.2 [M+H]⁺.

Step 5. Synthesis of 4-bromo-N-(2-methoxybenzyl)-2-nitroaniline (IX-1)

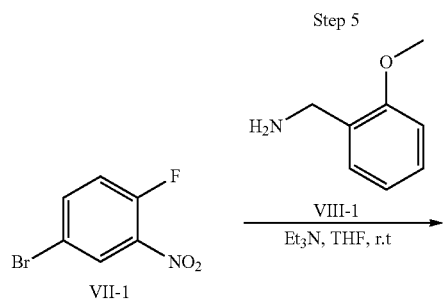

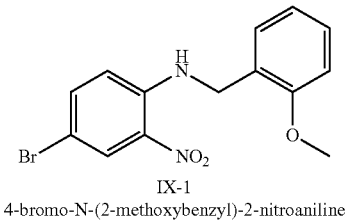

IX-1
4-bromo-N-(2-methoxybenzyl)-2-nitroaniline

In a reaction flask, 2-methoxybenzylamine (10.0 g, 73.1 mmol), VII-1 (16.0 g, 73.1 mmol), triethylamine (14.7 g, 146.2 mmol) and tetrahydrofuran (200.0 mL) were added sequentially and stirred overnight at room temperature. After the reaction was complete, the solvent was evaporated under reduced pressure. Then water (100.0 mL) was added. The system was extracted with ethyl acetate (150.0 mL×3). The organic phases were washed by saturated salt water and dried with anhydrous sodium sulfate. The solvent was evaporated under reduced pressure to obtain yellow solid IX-1 (22.0 g, yield: 89.8%). $^1$H NMR (400 MHz, CDCl$_3$) δ: 8.49 (s, 1H), 8.31 (s, 1H), 7.43 (d, J=2.0 Hz, 1H), 7.41-7.19 (m, 2H), 6.94-6.90 (m, 2H), 6.79 (d, J=9.2 Hz, 1H), 4.52 (d, J=6.0 Hz, 2H), 8.49 (s, 3H).

Step 6. Synthesis of 4-bromo-Ni-(2-methoxybenzyl)benzene-1,2-diamine (X-1)

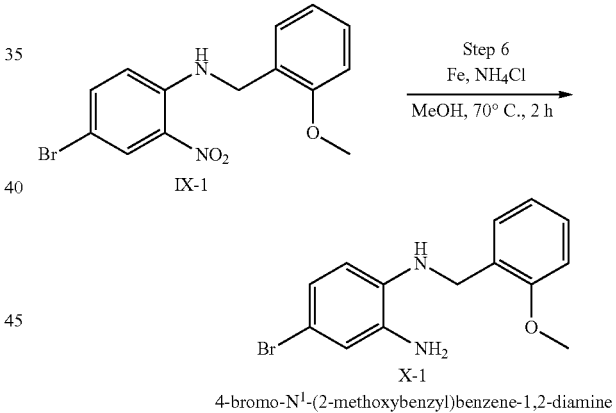

X-1
4-bromo-N$^1$-(2-methoxybenzyl)benzene-1,2-diamine

In a reaction bottle, IX-1 (22.0 g, 65.5 mmol), ammonium chloride (17.7 g, 327.4 mmol), iron powder (18.3 g, 327.4 mmol) and methanol (500.0 mL) were added sequentially and heated to 70° C. and stirred for 2 hours. After the reaction was completed, the reaction mixture was filtered. The filter cake was washed by methanol. The filtrate was collected. The solvent was evaporated under reduced pressure. Then water was added (100.0 mL). The system was extracted by dichloromethane (150.0 mL×3). The organic phases were washed by saturated salt water and dried with anhydrous sodium sulfate. Then the solvent was evaporated under reduced pressure to obtain off-white solid X-1 (19.6 g, yield 98.0%). LCMS (method B) purity: 84.53%. Rt=1.99 min; MS measurement: 306.0; MS measurement: 307.0 [M+H]⁺.

Step 7 Synthesis of N-(5-bromo 2-((2-methoxyben-zyl)amino)phenyl)propionamide (XII-1)

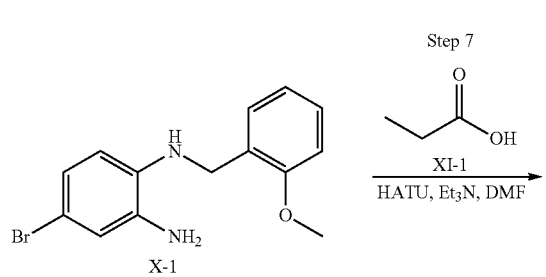

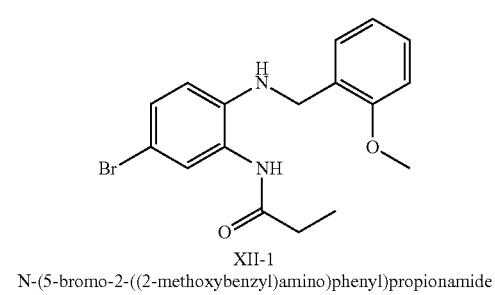

XII-1
N-(5-bromo-2-((2-methoxybenzyl)amino)phenyl)propionamide

In a reaction flask, X-1 (1.5 g, 4.9 mmol), propionic acid (0.36 g, 4.9 mmol), HATU (2.2 g, 5.9 mmol), triethylamine (0.99 g, 9.8 mmol) and N, N-dimethylformamide (30.0 mL) were added sequentially and stirred for 3 hours at room temperature. After the reaction was completed, the reaction solution was poured into water and extracted by ethyl acetate (60.0 mL×3). The organic phases were washed with water and saturated salt water sequentially, then dried with anhydrous sodium sulfate. Then the solvent was evaporated under reduced pressure to obtain a crude product. The crude product was subjected to silica gel column purification [eluent: petroleum ether-ethyl acetate (3:1)]. The eluant was collected. The solvent was evaporated under reduced pressure to obtain a white solid XII-1 (1.5 g, yield: 84.7%). LCMS (method B) purity: 93.39%. Rt=2.18 min; MS measurement: 362.1; MS measurement: 363.2 [M+H]$^+$.

Step 8. Synthesis of 5-bromo-2-ethyl-1-(2-methoxy-benzyl)-1H-benzo[d]imidazole (XIII-1)

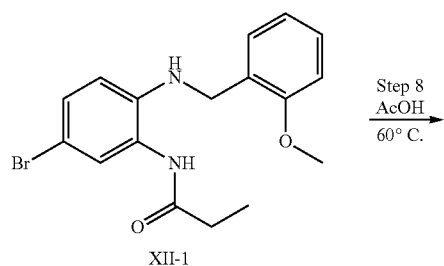

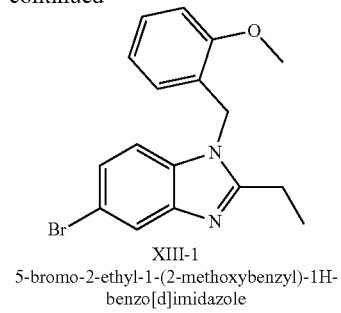

XIII-1
5-bromo-2-ethyl-1-(2-methoxybenzyl)-1H-benzo[d]imidazole

In a reaction flask, XII-1 (1.5 g, 4.14 mmol) and glacial acetic acid (20.0 mL) were added then heated to 60° C. to react for 2 hours. After the reaction was completed, the solvent was evaporated under reduced pressure to obtain a crude product. The crude product was subjected to silica gel column purification [eluent: petroleum ether-ethyl acetate (3:1)]. Then the eluant was collected. The solvent was evaporated under reduced pressure to obtain a yellow solid XIII-1 (1.2 g, yield: 84.5%). LCMS (method B) purity: 97.21%, Rt=1.68 min; MS measurement: 344.1; MS measurement: 345.2 [M+H]$^+$.

Step 9. Synthesis of 2-((5-bromo-2-ethyl-1H-benzo[d]imidazole-1-yl)methyl)phenyl (XIV-1)

XIII-1

XIV-1
2-((5-bromo-2-ethyl-1H-benzo[d]imidazol-1-yl)methyl)phenol

In a reaction flask, XIII-1 (1.5 g, 4.14 mmol) and glacial acetic acid (20.0 mL) were added then heated to 60° C. to react for 2 hours. After the reaction was completed, the solvent was evaporated under reduced pressure to obtain a crude product. The crude product was subjected to silica gel column purification [eluent: petroleum ether-ethyl acetate (3:1)]. Then the eluant was collected. The solvent was evaporated under reduced pressure to obtain a yellow solid XIV-1 (1.2 g, yield: 84.5%) LCMS (method B) purity: 97.21%, Rt=1.68 min; MS measurement: 344.1; MS measurement: 345.2 [M+H]$^+$.

Step 10. Synthesis of ethyl 2-(4-((2-((5-bromo-2-ethyl-1H-benzo[d]imidazol-1-yl)methyl)-phenoxy)methyl)-2-ethylphenoxy) acetate (XV-1)

Step 11. Synthesis of 2-(4-((2-((5-bromo-2-ethyl-1H-benzo[d]imidazol-1-yl)methyl)-phenoxy)methyl)-2-ethylphenoxy)acetic acid (1)

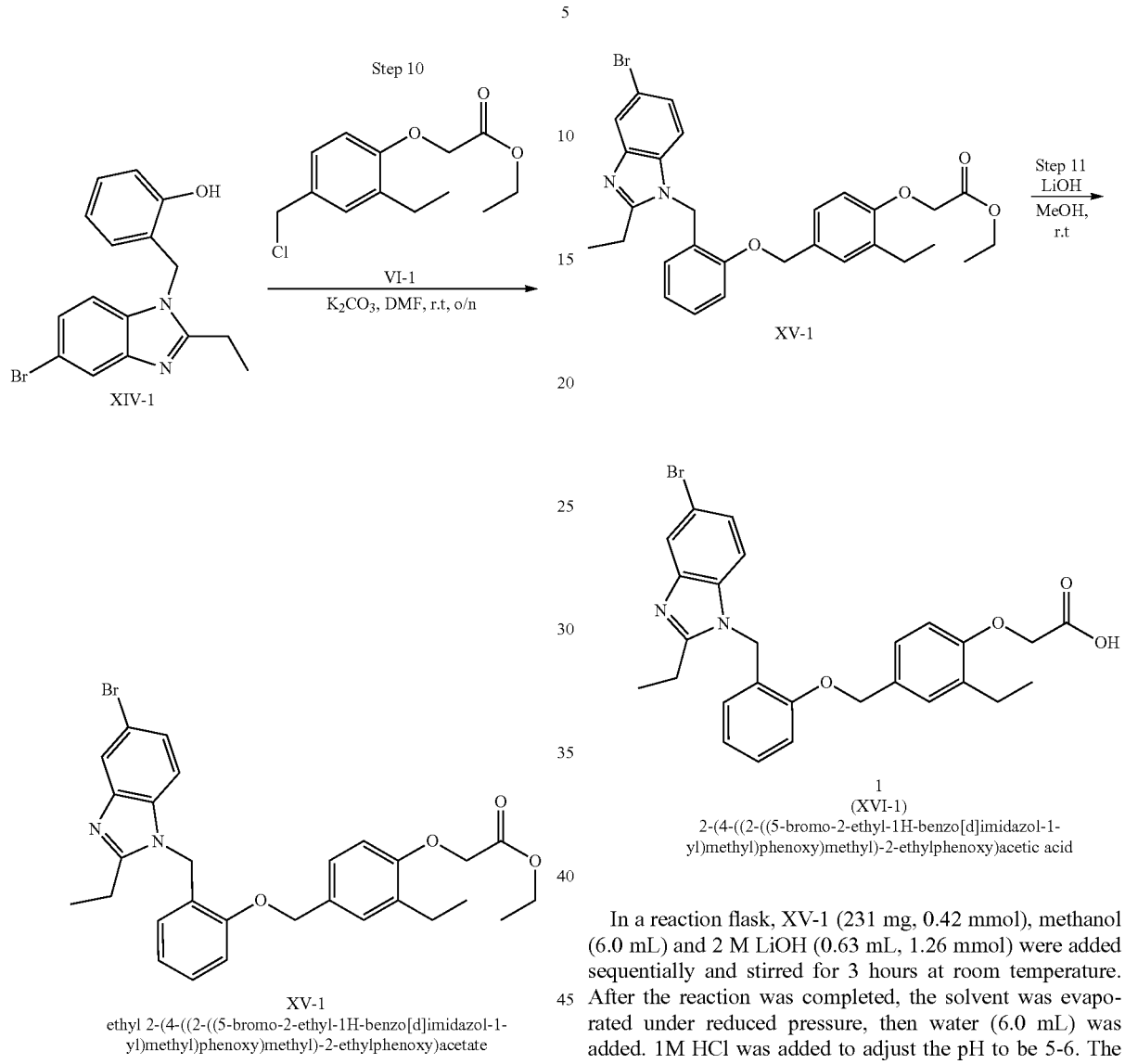

XV-1
ethyl 2-(4-((2-((5-bromo-2-ethyl-1H-benzo[d]imidazol-1-yl)methyl)phenoxy)methyl)-2-ethylphenoxy)acetate 1
(XVI-1)
2-(4-((2-((5-bromo-2-ethyl-1H-benzo[d]imidazol-1-yl)methyl)phenoxy)methyl)-2-ethylphenoxy)acetic acid In a reaction flask, XIV-1 (157 mg, 0.47 mmol), VI-1 (122 mg, 0.47 mmol), potassium carbonate (197 mg, 1.43 mmol) and N,N-dimethylformamide (5.0 mL) were added sequentially and stirred overnight at room temperature. After the reaction was completed, the reaction solution was poured into water then extracted by ethyl acetate (20.0 mL×3). The organic phases were washed with water and saturated salt water sequentially, dried with anhydrous sodium sulfate. The solvent was evaporated under reduced pressure to obtain a crude product. The crude product was subjected to silica gel column purification [eluent: petroleum ether-ethyl acetate (3:1)]. Then the eluant was collected. The solvent was evaporated under reduced pressure to obtain a colorless oily substance XV-1 (231 mg, yield: 88.2%). LCMS (Method A) purity: 93.53%. Rt=0.75 min; MS measurement: 550.2; MS measurement: 551.2 [M+H]$^+$.

In a reaction flask, XV-1 (231 mg, 0.42 mmol), methanol (6.0 mL) and 2 M LiOH (0.63 mL, 1.26 mmol) were added sequentially and stirred for 3 hours at room temperature. After the reaction was completed, the solvent was evaporated under reduced pressure, then water (6.0 mL) was added. 1M HCl was added to adjust the pH to be 5-6. The system was filtered. The filter cake was washed with water, then dried to obtain a white solid 1 (XVI-1) (100 mg, yield: 45.7%). HPLC-MS (method D) purity: 97.10%, Rt=8.36 min; MS measurement: 522.2; MS measurement: 523.2 [M+H]$^+$.

$^1$H NMR (400 MHz, DMSO-d$_6$) δ: 13.00 (brs, 1H, H9), 7.79 (d, J=1.6 Hz, 1H, H1), 7.37-7.24 (m, 3H), 7.14-7.09 (m, 2H), 7.03 (d, J=2.0 Hz, 1H, H7), 6.90-6.84 (m, 2H), 6.79 (d, J=8.4 Hz, 1H), 5.41 (s, 2H, H4), 4.99 (s, 2H, H5), 4.70 (s, 2H, H6), 2.82 (q, J=7.2 Hz, 2H, H2), 2.58 (q, J=7.6 Hz, 2H, H7), 1.17-1.08 (in, 6H, H3, H8).

Examples 2-12

A wide range of derivatives can be synthesized in accordance with the method of Example 1, as long as the starting materials are changed properly. Examples 2-12 list some of the representative examples (see Table 1).

TABLE 1

| Examples | Structure | Name | m/z[MH]+ |
|---|---|---|---|
| 2 | | 2-(4-((2-((2-amino-5-bromo--1H-benzo[d]imidazol-1-yl)methyl)phenoxy)methyl)-2-ethylphenoxy)acetic acid | 509.10 |
| 3 | | 3-(4-((2-((5-Bromo-2-(2,4-dichlorophenethyl)-1H-benzo[d]imidazol-1-yl)methyl)phenoxy)methyl)-2-ethylphenyl)propanoic acid | 664.09 |
| 4 | | 3-(4-((2-((5-Bromo-2-butyl-1H-benzo[d]imidazol-1-yl)methyl)phenoxy)methyl)-2-ethylphenyl)propanoic acid | 548.17 |
| 5 | | 2-(4-((2-((5-Bromo-2-ethyl-1H-benzo[d]imidazol-1-yl)methyl)-4-methoxy-phenoxy)methyl)-2-ethylphenoxy)acetic acid | 552.13 |

TABLE 1-continued

| Examples | Structure | Name | m/z[MH]+ |
|---|---|---|---|
| 6 | | 3-(4-((2-((5-Bromo-1H-benzo[d]imidazol-1-yl)methyl)-3-methoxyphenoxy)methyl)-2-ethylphenyl)propanoic acid | 552.12 |
| 7 | | 2-(4-((2-((5-Bromo-2-ethyl-1H-benzo[d]imidazol-1-yl)methyl)phenoxy)methyl)benzyl)butanoic acid | 520.14 |
| 8 | | 3-(4-((2-((5-Bromo-2-ethyl-1H-benzo[d]imidazol-1-yl)methyl)phenoxy)methyl)-2-methylphenyl)propanoic acid | 506.12 |
| 9 | | 3-(2-Ethyl-4-((2-((1-(2-(pyrrolidin-1-yl)ethyl)-1H-benzo[d]imidazol-2-yl)methyl)phenoxy)methyl)phenyl)propanoic acid | 511.28 |

TABLE 1-continued

| Examples | Structure | Name | m/z[MH]+ |
|---|---|---|---|
| 10 | | 3-(4-((2-((5-Bromo-1-(2-(pyrrolidin-1-yl)ethyl)-1H-benzo[d]imidazol-2-yl)methyl)-phenoxy)methyl)-2-ethylphenyl)propanoic acid | 589.19 |
| 11 | | 3-(2-Ethy-4-((3-((2-ethyl-1H-benzo[d]imidazol-1-yl)methyl)-4-methoxyphenoxy)methyl)phenyl)propanoic acid | 472.24 |
| 12 | | 2-(2-Ethyl-4-((4-((1-ethyl-1H-benzo[d]imidazol-2-yl)methyl)-3-methoxyphenoxy)methyl)phenoxy)acetic acid | 474.22 |
| 13 | | 3-(2-Ethyl-4-((4-((1-(2-(pyrrolidin-1-yl)ethyl)-1H-benzo[d]imidazol-2-yl)methyl)phenoxy)methyl)phenyl)propanoic acid | 511.28 |

TABLE 1-continued

| Examples | Structure | Name | m/z[MH]+ |
|---|---|---|---|
| 14 | | 3-(4-((2-((5-Bromo 2-(pyrrolidin-1-yl)methyl)-1H-benzo[d]imidazol-1-yl)methyl)-phenoxy)methyl)-2ethylphenyl) propanoic acid | 575.18 |
| 15 | | 2-(4-((2-((5-Bromo-2-(3-(pyrrolidin-1-yl)propyl)-1H-benzo[d]imidazol-1-yl)methyl)phenoxy)methyl)-2-ethylphenoxy)acetic acid | 605.19 |
| 16 | | 3-(4-((2-((5-Bromo-2-ethyl-1H-benzo[d]imidazol-1-yl)methyl)-phenoxy)methyl)-2-ethylphenyl) propanoic acid | 520.14 |
| 17 | | 3-(4-((2-((5-Bromo-2-(3-(pyrrolidin-1-yl)propyl)-1H-benzo[d]imidazol-1-yl)methyl)-phenoxy)methyl)-2-ethylphenyl)propanoic acid | 603.21 |

TABLE 1-continued

| Examples | Structure | Name | m/z[MH]+ |
|---|---|---|---|
| 18 | | 2-(4-((2-((5-Bromo-2-ethyl-1H-benzo[d]imidazol-1-yl)methyl)phenoxy)methyl)-2-ethylphenoxy)acetic acid | 522.12 |

Besides, by reference to the method provided by Example 1, a wide range of derivatives can be synthesized as long as the starting materials are selected properly. The compounds listed in Table 2 are some of the examples

TABLE 2

19
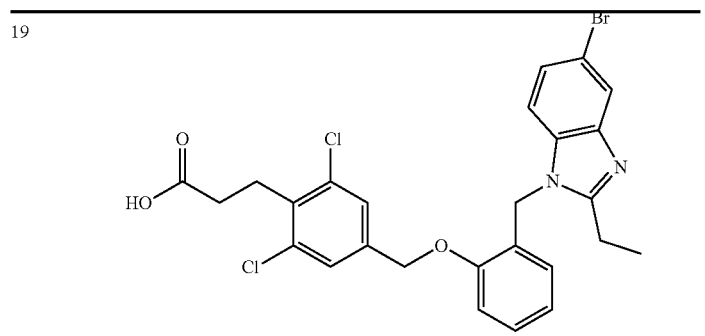
m/z[MH]+ 560.03

20
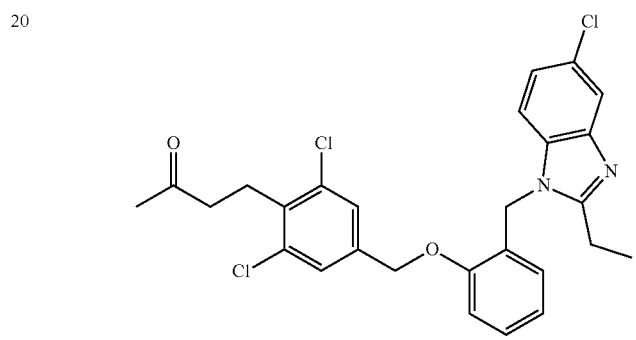
m/z[MH]+ 516.08

21
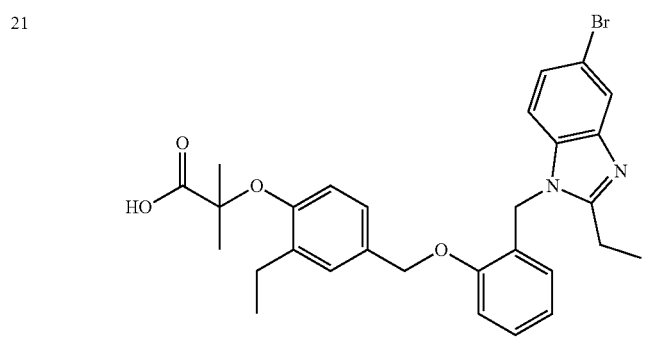
m/z[MH]+ 550.15

TABLE 2-continued
22
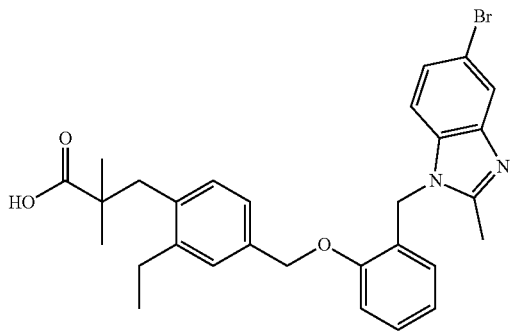 [SMILES: CCc1cc(COc2ccccc2Cn2c(C)nc3cc(Br)ccc32)ccc1CC(C)(C)C(=O)O]
m/z[MH]$^+$ 553.45
23
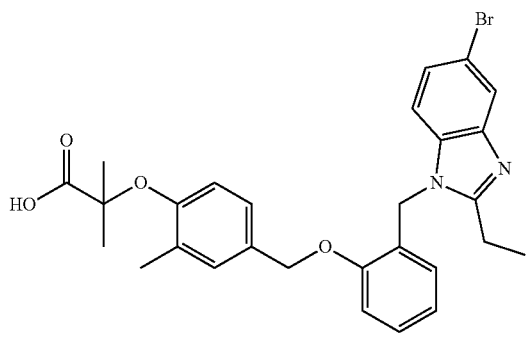 [SMILES: CCc1nc2cc(Br)ccc2n1Cc1ccccc1OCc1ccc(OC(C)(C)C(=O)O)c(C)c1]
m/z[MH]$^+$ 536.47
24
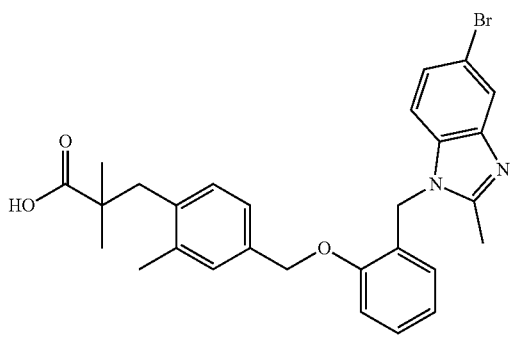
24
m/z[MH]$^+$ 521.45
25
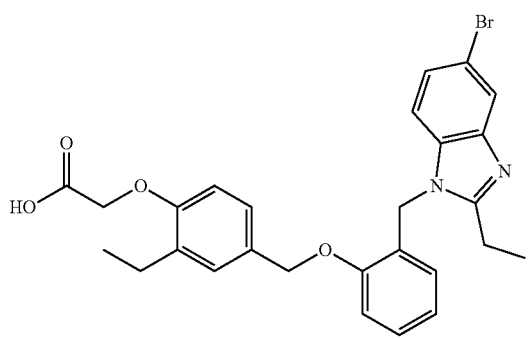 [SMILES: CCc1cc(COc2ccccc2Cn2c(CC)nc3cc(Br)ccc32)ccc1OCC(=O)O]
m/z[MH]$^+$ 521.12

TABLE 2-continued
26
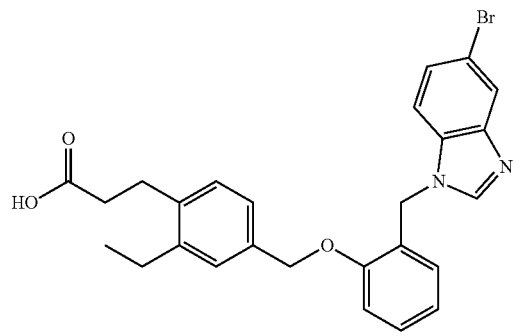 [SMILES: CCc1cc(COc2ccccc2Cn2cnc3cc(Br)ccc32)ccc1CCC(=O)O]
m/z[MH]+ 492.10
27
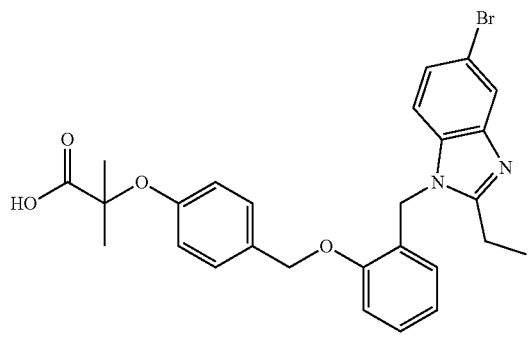 [SMILES: CCc1nc2cc(Br)ccc2n1Cc1ccccc1OCc1ccc(OC(C)(C)C(=O)O)cc1]
m/z[MH]+ 522.12
28
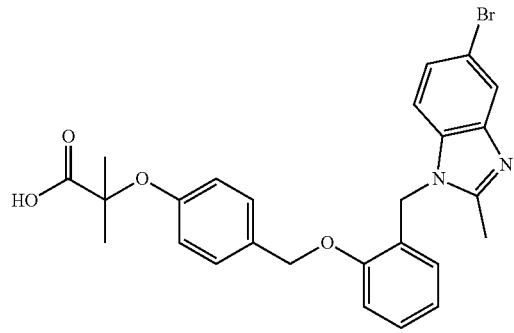 [SMILES: Cc1nc2cc(Br)ccc2n1Cc1ccccc1OCc1ccc(OC(C)(C)C(=O)O)cc1]
m/z[MH]+ 506.12
29
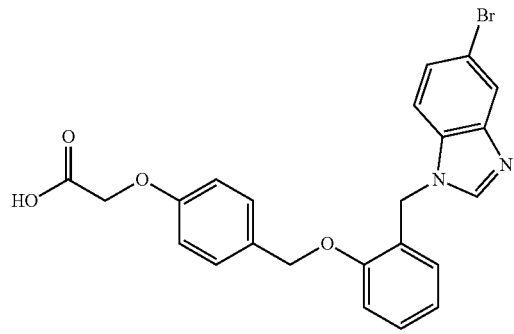 [SMILES: O=C(O)COc1ccc(COc2ccccc2Cn2cnc3cc(Br)ccc32)cc1]
m/z[MH]+ 466.05

TABLE 2-continued
30
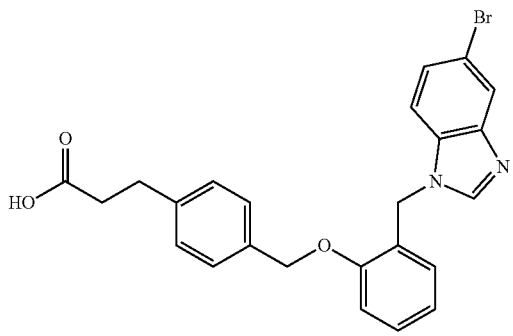 [SMILES: O=C(O)CCc1ccc(COc2ccccc2Cn2cnc3cc(Br)ccc32)cc1]
m/z[MH]+ 464.07
31
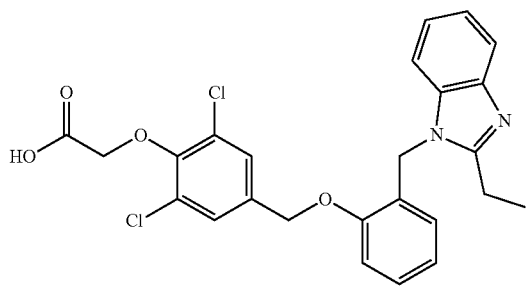 [SMILES: CCc1nc2ccccc2n1Cc1ccccc1OCc1cc(Cl)c(OCC(=O)O)c(Cl)c1]
m/z[MH]+ 484.10
32
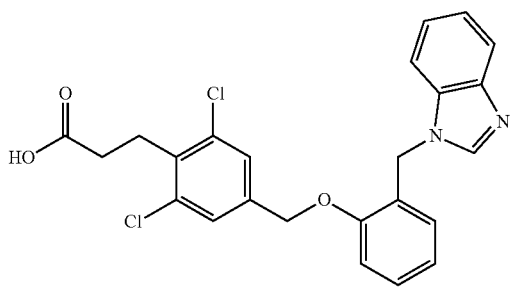 [SMILES: O=C(O)CCc1c(Cl)cc(COc2ccccc2Cn2cnc3ccccc32)cc1Cl]
m/z[MH]+ 454.09
33
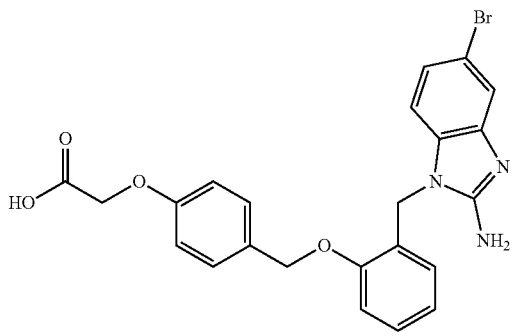 [SMILES: Nc1nc2cc(Br)ccc2n1Cc1ccccc1OCc1ccc(OCC(=O)O)cc1]
m/z[MH]+ 481.06

TABLE 2-continued
34
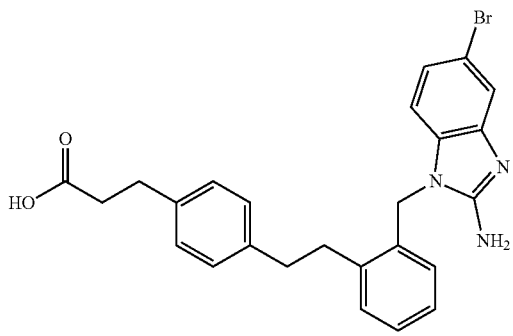 [SMILES: Nc1nc2cc(Br)ccc2n1Cc1ccccc1CCc1ccc(CCC(=O)O)cc1]
m/z[MH]+ 477.11
35
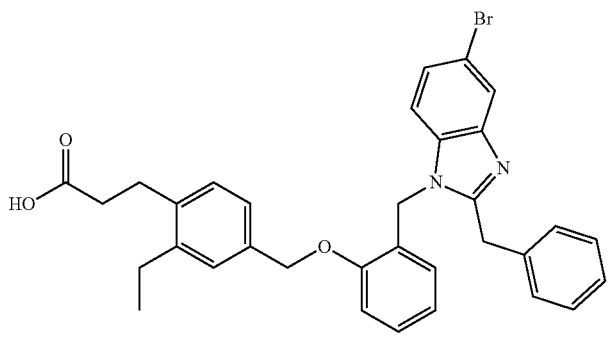 [SMILES: CCc1cc(COc2ccccc2Cn2c(Cc3ccccc3)nc3cc(Br)ccc32)ccc1CCC(=O)O]
m/z[MH]+ 481.06
36
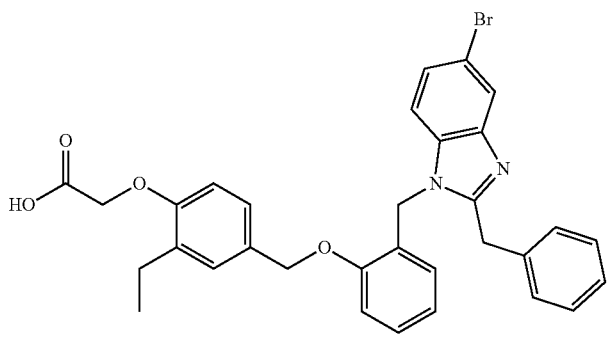 [SMILES: CCc1cc(COc2ccccc2Cn2c(Cc3ccccc3)nc3cc(Br)ccc32)ccc1OCC(=O)O]
m/z[MH]+ 477.11
37
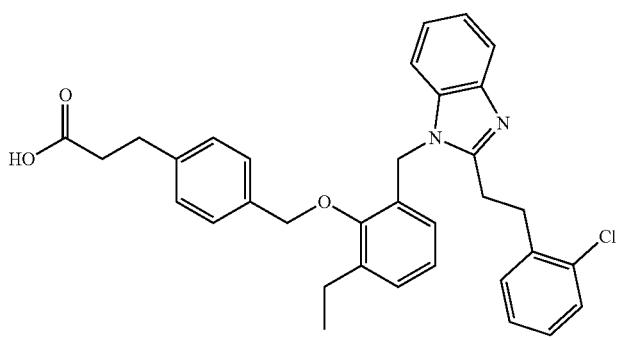
m/z[MH]+ 552.22

TABLE 2-continued
38
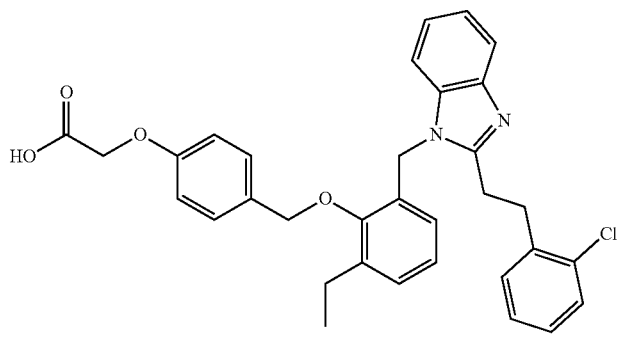 [SMILES: CCc1cccc(Cn2c(CCc3ccccc3Cl)nc3ccccc32)c1OCc1ccc(OCC(=O)O)cc1]
m/z[MH]+ 554.20
39
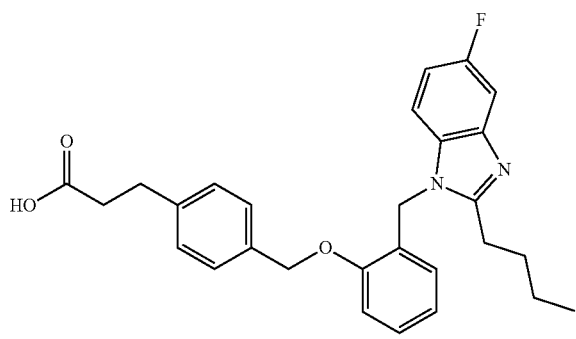 [SMILES: CCCCc1nc2cc(F)ccc2n1Cc1ccccc1OCc1ccc(CCC(=O)O)cc1]
m/z[MH]+ 460.22
40
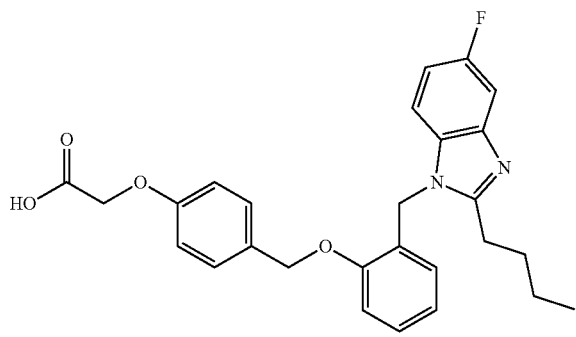 [SMILES: CCCCc1nc2cc(F)ccc2n1Cc1ccccc1OCc1ccc(OCC(=O)O)cc1]
m/z[MH]+ 462.20
41
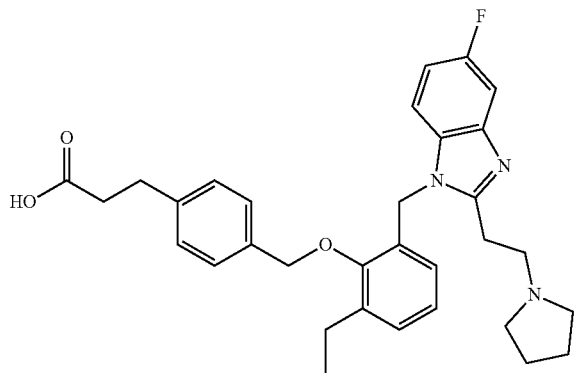 [SMILES: CCc1cccc(Cn2c(CCN3CCCC3)nc3cc(F)ccc32)c1OCc1ccc(CCC(=O)O)cc1]
m/z[MH]+ 529.27

TABLE 2-continued
42
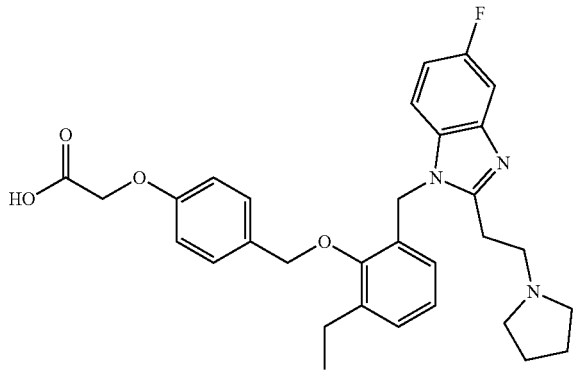 [SMILES: CCc1cccc(Cn2c(CCN3CCCC3)nc3cc(F)ccc32)c1OCc1ccc(OCC(=O)O)cc1]
m/z[MH]$^+$ 531.25
43
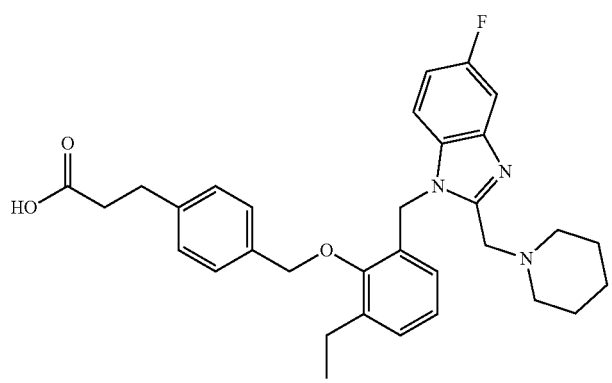 [SMILES: CCc1cccc(Cn2c(CN3CCCCC3)nc3cc(F)ccc32)c1OCc1ccc(CCC(=O)O)cc1]
m/z[MH]$^+$ 529.27
44
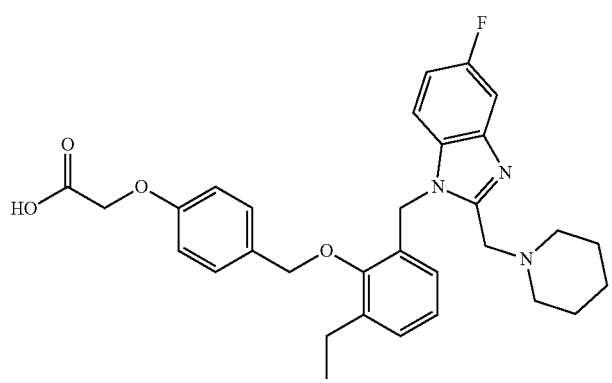 [SMILES: CCc1cccc(Cn2c(CN3CCCCC3)nc3cc(F)ccc32)c1OCc1ccc(OCC(=O)O)cc1]
m/z[MH]$^+$ 531.25

TABLE 2-continued
| 45 | 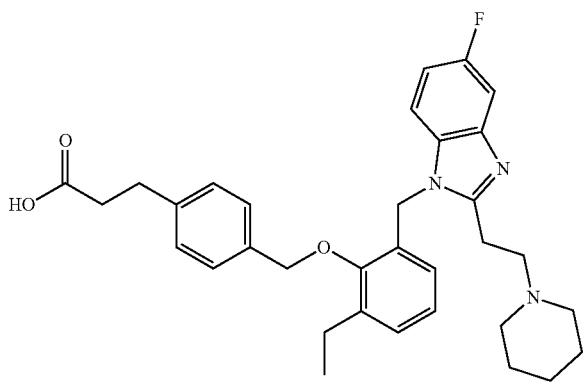 [SMILES: CCc1cccc(Cn2c(CCN3CCCCC3)nc3cc(F)ccc32)c1OCc1ccc(CCC(=O)O)cc1]
m/z[MH]+ 543.29 |
| 46 | 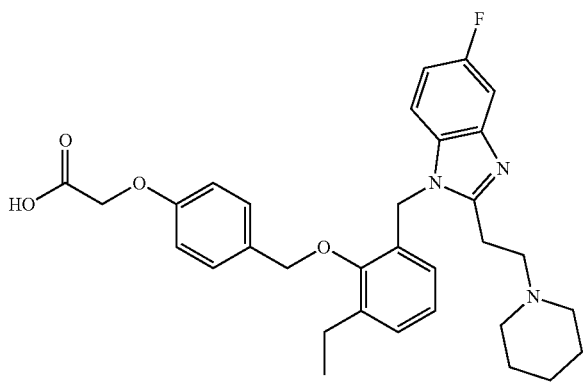 [SMILES: CCc1cccc(Cn2c(CCN3CCCCC3)nc3cc(F)ccc32)c1OCc1ccc(OCC(=O)O)cc1]
m/z[MH]+ 545.27 |
| 47 | 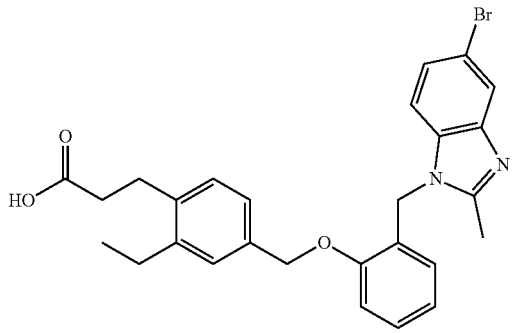 [SMILES: CCc1cc(COc2ccccc2Cn2c(C)nc3cc(Br)ccc32)ccc1CCC(=O)O]
m/z[MH]+ 506.12 |
| 48 | 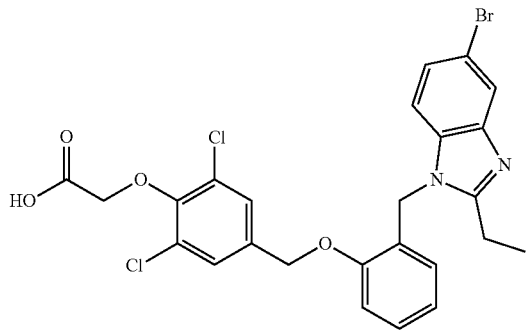 [SMILES: CCc1nc2cc(Br)ccc2n1Cc1ccccc1OCc1cc(Cl)c(OCC(=O)O)c(Cl)c1]
m/z[MH]+ 562.01 |

TABLE 2-continued

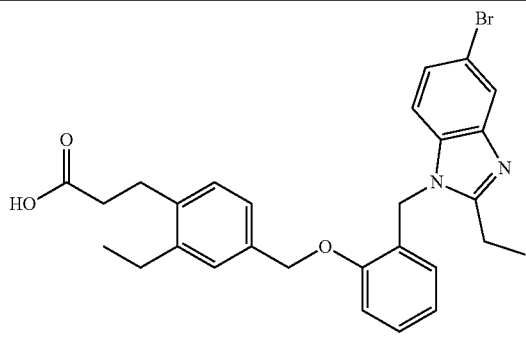

49 m/z[MH]+ 520.14

50 m/z[MH]+ 577.16

Pharmacological Experiment

I. Experiment Methods

The following methods were used to determine the PPAR activation effect of the tested compounds (compounds in the examples)

Receptor expression plasmid (pSG5-GAL4-hPPARα, 7 or 6 (LBD)), luciferase expression plasmid (pUC8-MH100× 4-TK-Luc) and β-Galactosidase expression plasmid (pCMX-β-GAL) (Kilewer, S. A. et. al., (1992) Nature, 358: 771-774) were introduced into CV-1 cells (ATCC). After gene introduction using a lipofection reagent (Lipofectamine 2000 (Invitrogen)), the cells were cultured in the presence of the test compounds for about 40 hours. Soluble cells were used in luciferase activity and β-GAL activity determinations. β-GAL activity was used to correct luciferase activity, using the luciferase activity in cells treated with GW-590735 (PPARα selective agonist) as 100% to calculate the relative ligand activity of PPARα, and using the luciferase activity in cells treated with Rosiglitazone as 100% to calculate the relative ligand activity of PPARγ, and using the luciferase activity in cells treated with GW-501516 as 100% to calculate the relative ligand activity of PPARδ, and the $EC_{50}$ values were calculated.

II. Experiment Results

The experiment results were shown in Table 3.

TABLE 3

| | PPAR activities | | |
|---|---|---|---|
| | | $EC_{50}$ (µM) | |
| Compounds | PPARα | PPARγ | PPARδ |
| 2 (m/z[MH]+ 509.10) | 0.2429 | 5.682 | 1.623 |
| 3 (m/z[MH]+ 644.09) | 0.104 | 0.1857 | 0.0365 |
| 4 m/z[MH]+ 548.17 | 0.202 | 2.368 | 0.03314 |
| 5 m/z[MH]+ 552.13 | 0.3763 | 13.43 | 21.06 |
| 6 m/z[MH]+ 522.12 | 0.1548 | 6.652 | 6.11 |
| 7 m/z[MH]+ 520.14 | 0.1603 | 6.808 | 12.81 |
| 8 m/z[MH]+ 506.12 | 0.1563 | 2.785 | 0.01419 |
| 9 m/z[MH]+ 511.28 | 0.09364 | 9.195 | 4.77 |

TABLE 3-continued

PPAR activities

| Compounds | EC$_{50}$ (μM) | | |
|---|---|---|---|
| | PPARα | PPARγ | PPARδ |
| 10 m/z[MH]$^+$ 589.19 | 0.1229 | 4.373 | 0.6597 |
| 11 m/z[MH]$^+$ 472.24 | 0.0901 | 2.298 | 19.85 |
| 12 m/z[MH]$^+$ 474.22 | 2.101 | 8.771 | 29.78 |
| 13 m/z[MH]$^+$ 511.28 | 1.058 | 6.59 | 21.03 |
| 14 m/z[MH]$^+$ 575.18 | 3.424 | 0.6725 | 0.1418 |
| 15 m/z[MH]$^+$ 605.19 | 2.112 | 9.112 | 6.561 |
| 17 m/z[MH]$^+$ 603.21 | 3.045 | 15.45 | 41.77 |
| 18 m/z[MH]$^+$ 522.12 | 0.2647 | 4.918 | 0.0697 |
| 50 m/z[MH]$^+$ 577.16 | 3.989 | 2.038 | 0.8035 |

II. Experiment Results

The experiment results were shown in Table 3.

PPAR activities: the relative values in 10$^{-7}$ M of the tested compound, using the control medicine as 10000.

PPARα: GW-590735 10$^{-6}$M

PPARγ: Rosiglitazone 10$^{-5}$M

PPARδ: GW-501516 10$^{-7}$M

From Table 3, it can be seen that the test compounds showed excellent PPARδ activator effects, especially the compound of example 5 showed strong and selective PPARδ activator effect.

Details of specific examples described in the present invention are not meant to be inferred as limiting. Various synonymous transformations and modifications can be made without departing from the nature and scope of the invention, but knowing such synonymous embodiments are parts of this invention.

The invention claimed is:

1. A compound represented by formula (I) or a pharmaceutically acceptable salt, polymorph, tautomer, stereoisomer, hydrate, solvate or isotopic variant thereof:

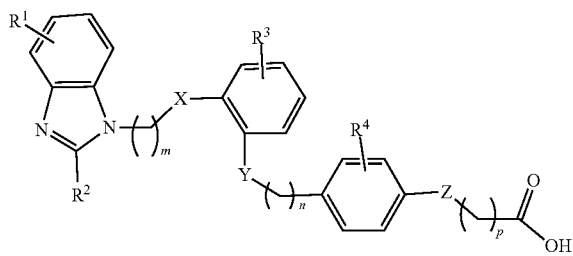

formula (I)

wherein,

R$^1$ is selected from H, —CN, —NO$_2$, —CF$_3$, —OCF$_3$, —CO$_2$H, OH, halogen, amino, alkyl, alkenyl, haloalkyl, haloalkenyl, heteroalkyl, heterocycloalkyl, arylalkyl, cycloalkyl, aryl, heterocycloaryl, heterocycloarylalkyl, heterocycloalkyl, heterocycloalkenyl, alkoxy, alkoxyalkyl, alkenyloxy, alkynyloxy, amino, alkylamino, aminoalkyl, alkylaminocarbonyl, sulfonyl, alkylsulfonyl, alkylsulfinyl, aminosulfonyl, or acyl, each of which is un-substituted or substituted with one or more substituents selected from the group consisting of halogen, —CF$_3$, alkyl, alkenyl, alkynyl, hydroxyl, hydroxyalkyl, alkoxy, and alkoxyalkyl;

R$^2$ is selected from H, —CN, —NO$_2$, —CF$_3$, —OCF$_3$, —CO$_2$H, OH, —CONHR$^5$, —CSNHR$^6$, —SR$^7$, halogen, amino, alkyl, alkenyl, haloalkyl, haloalkenyl, heteroalkyl, heterocycloalkyl, arylalkyl, cycloalkyl, aryl, heterocycloaryl, heterocycloarylalkyl, heterocycloalkyl, heterocycloalkenyl, alkoxy, alkoxyalkyl, alkylamino, alkylaminocarbonyl, sulfonyl, alkylsulfonyl, alkylsulfinyl, or aminosulfonyl, each of which is un-substituted or substituted with one or more substituents selected from the group consisting of halogen, —CF$_3$, alkyl, alkenyl, alkynyl, hydroxy, hydroxyalkyl, alkoxy, and alkoxyalkyl;

R$^3$ is selected from H, —CN, —NO$_2$, —CF$_3$, —OCF$_3$, —CO$_2$H, OH, —SR$^7$, halogen, amino, alkyl, alkoxy, alkoxyalkyl, heteroalkyl, heterocycloalkyl, arylalkyl, cycloalkyl, heterocycloarylalkyl, heterocycloalkyl, heterocycloalkenyl, alkenyloxy, alkynyloxy, alkylamino, aminoalkyl, or alkylaminocarbonyl, each of which is un-substituted or substituted with one or more substituents selected from the group consisting of halogen, —CF$_3$, alkyl, alkenyl, alkynyl, hydroxy, hydroxyalkyl, alkoxy, and alkoxyalkyl;

R$^4$ is selected from H, —CN, —NO$_2$, —CF$_3$, —OCF$_3$, —SR$^7$, halogen, amino, alkyl, alkoxy, alkoxyalkyl, heteroalkyl, heterocycloalkyl, arylalkyl, cycloalkyl, heterocycloarylalkyl, heterocycloalkyl, heterocycloalkenyl, alkenyloxy, alkynyloxy, alkylamino, aminoalkyl, alkylaminocarbonyl, each of which is un-substituted or substituted with one or more substituents selected from the group consisting of halogen, —CF$_3$, alkyl, alkenyl, alkynyl, hydroxy, hydroxyalkyl, alkoxy, and alkoxyalkyl;

R$^5$ is selected from H, alkyl, heterocycloalkyl, arylalkyl, cycloalkyl, aryl, heterocycloaryl, heterocycloarylalkyl, heterocycloalkyl, or heterocycloalkenyl;

R$^6$ is selected from H, alkyl, heterocycloalkyl, arylalkyl, cycloalkyl, aryl, heterocycloaryl, heterocycloarylalkyl, heterocycloalkyl, or heterocycloalkenyl;

R$^7$ is selected from H, alkyl, heterocycloalkyl, cycloalkyl, aryl, heterocycloaryl, heterocycloalkyl, or heterocycloalkenyl;

m, n and p are each independently an integer selected from 0-6; and

X, Y and Z are each independently selected from —O—, —S—, —NH—, —SO$_2$—, —CONH— or (CH$_2$)$_q$, wherein q is an integer selected from 1-4.

2. The compound or a pharmaceutically acceptable salt, polymorph, tautomer, stereoisomer, hydrate, solvate or isotopic variant thereof according to claim 1, wherein R$^1$ is selected from H, hydroxyl, C$_{1-14}$ alkyl, C$_{2-14}$ heteroalkyl, C$_{5-12}$ arylC$_{1-14}$ alkyl, heteroarylC$_{1-14}$ alkyl, C$_{1-6}$ alkyloxyC$_{1-14}$ alkyl, aminoC$_{1-14}$ alkyl or C$_{4-7}$ heterocycloalkyl, each of which is un-substituted or substituted with one or more substituents independently selected from the group consisting of halogens, OH, C$_{1-14}$ alkyl, C$_{2-14}$ heteroalkyl, C$_{3-9}$ cycloalkyl, C$_{4-7}$ heterocycloalkyl, C$_{1-6}$ alkyloxy, amino and C$_{1-14}$ alkylamino.

3. The compound or a pharmaceutically acceptable salt, polymorph, tautomer, stereoisomer, hydrate, solvate or isotopic variant thereof according to claim 1, wherein R$^2$ is selected from H, hydroxyl, halogen, C$_{1-14}$ alkyl, C$_{2-14}$ heteroalkyl, or C$_{1-6}$ alkyloxyC$_{1-14}$ alkyl, each of which is un-substituted or substituted with one or more substituents independently selected from the group consisting of halogens, —CO$_2$H, OH, C$_{1-14}$ alkyl, C$_{2-14}$ heteroalkyl, C$_{3-9}$ cycloalkyl, C$_{4-7}$ heterocycloalkyl, C$_{1-6}$ alkyloxy, and C$_{5-12}$ arylC$_{1-14}$ alkyl.

4. The compound or a pharmaceutically acceptable salt, polymorph, tautomer, stereoisomer, hydrate, solvate or isotopic variant thereof according to claim 1, wherein R$^3$ is selected from H, hydroxyl, halogen, C$_{1-14}$ alkyl, C$_{2-14}$ heteroalkyl, or C$_{1-6}$ alkyloxyC$_{1-14}$ alkyl, each of which is un-substituted or substituted with one or more substituents independently selected from the group consisting of halogens, —CO$_2$H, OH, C$_{1-14}$ alkyl, C$_{2-14}$ heteroalkyl, C$_{3-9}$ cycloalkyl, C$_{4-7}$ heterocycloalkyl, C$_{1-6}$ alkyloxy, and C$_{5-12}$ arylC$_{1-14}$ alkyl.

5. The compound or a pharmaceutically acceptable salt, polymorph, tautomer, stereoisomer, hydrate, solvate or isotopic variant thereof according to claim 1, wherein the compound is selected from the following compounds or pharmaceutically acceptable salts thereof:

1

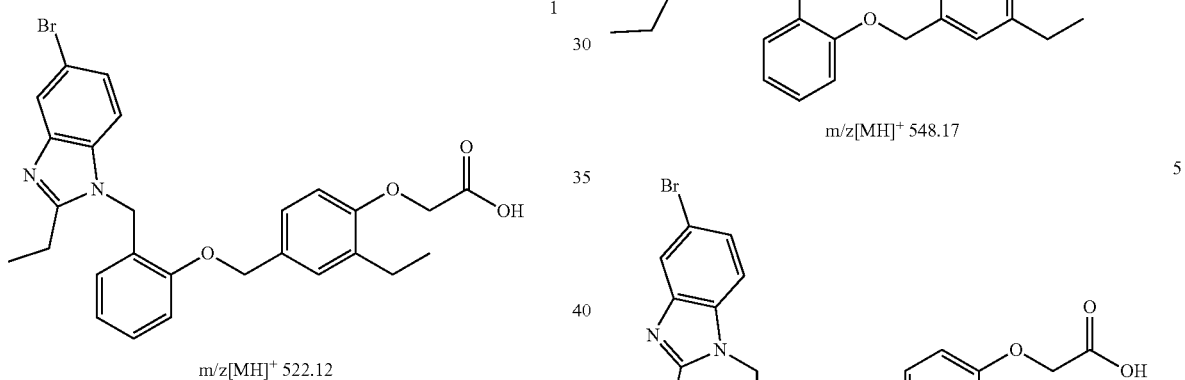

m/z[MH]$^+$ 522.12

2 m/z[MH]$^+$ 509.10

3

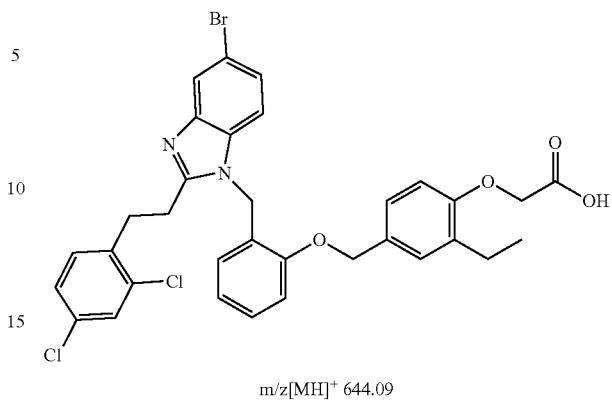

m/z[MH]$^+$ 644.09

4 m/z[MH]$^+$ 548.17

5

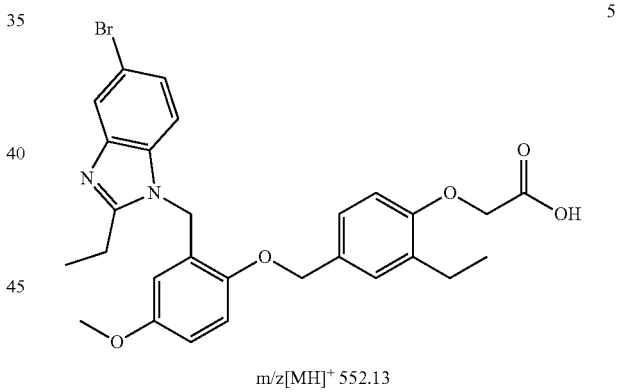

m/z[MH]$^+$ 552.13

6

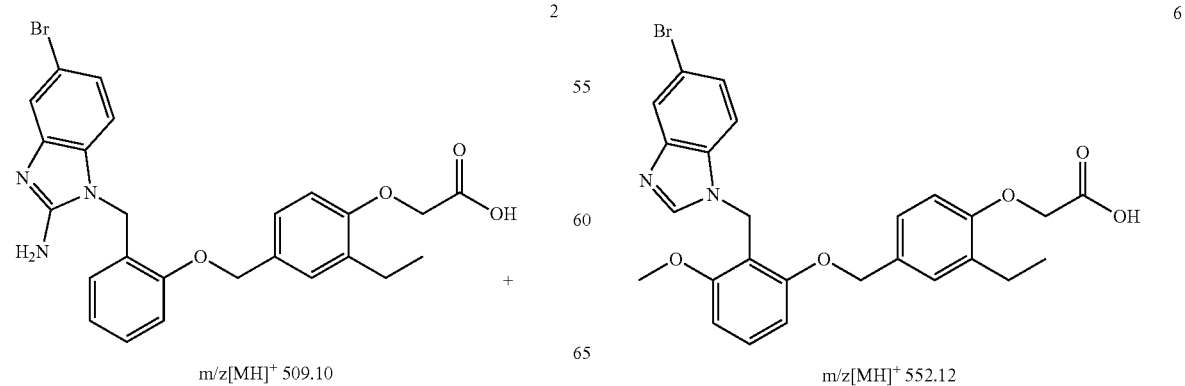

m/z[MH]$^+$ 552.12

7
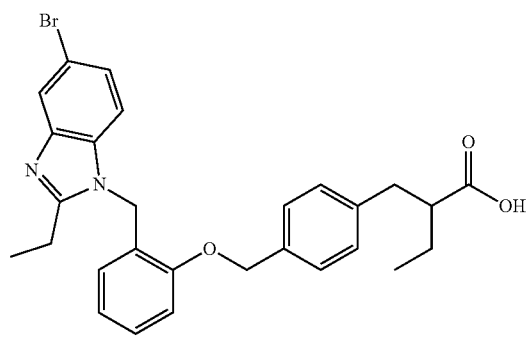
m/z[MH]+ 520.14
8
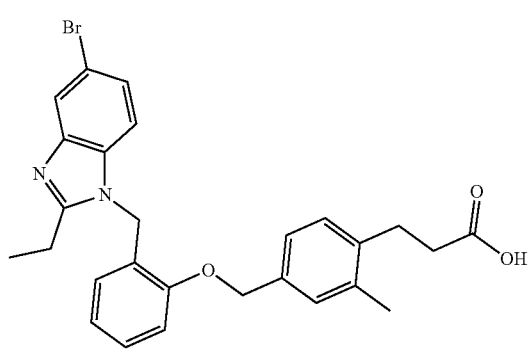
m/z[MH]+ 506.12
9
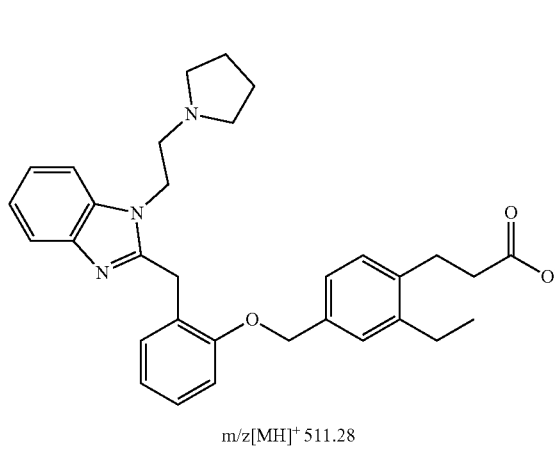
m/z[MH]+ 511.28
10
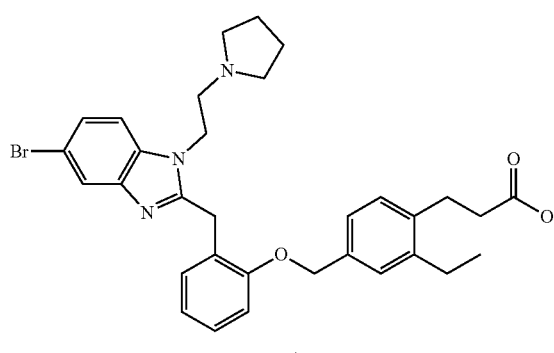
m/z[MH]+ 589.19
11
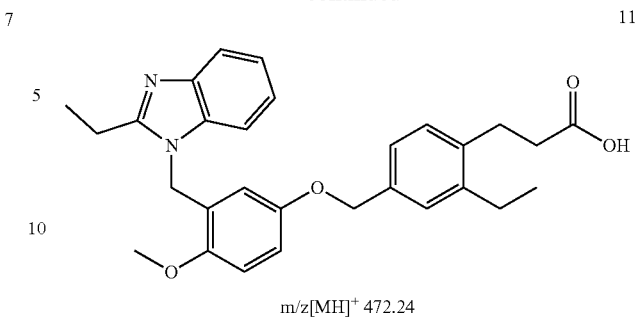
m/z[MH]+ 472.24
12
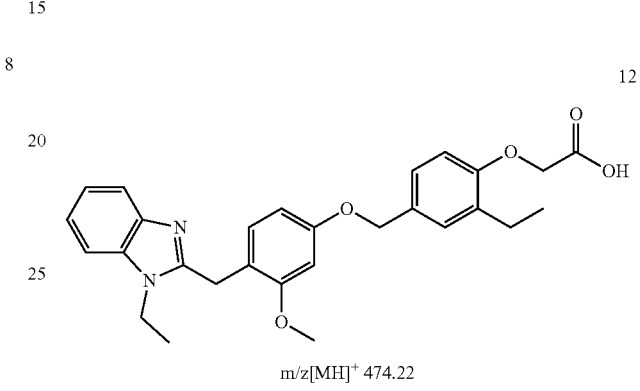
m/z[MH]+ 474.22
13
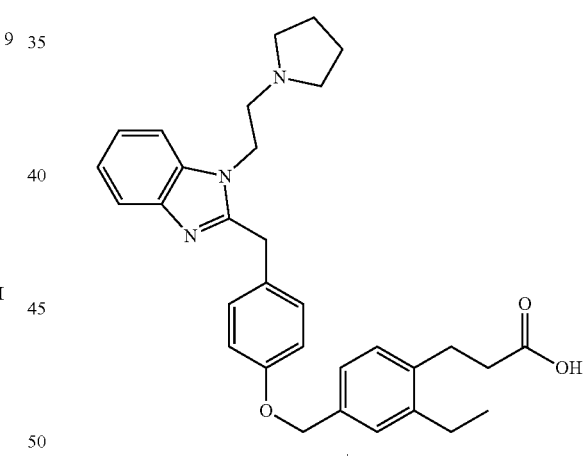
m/z[MH]+ 511.28
14
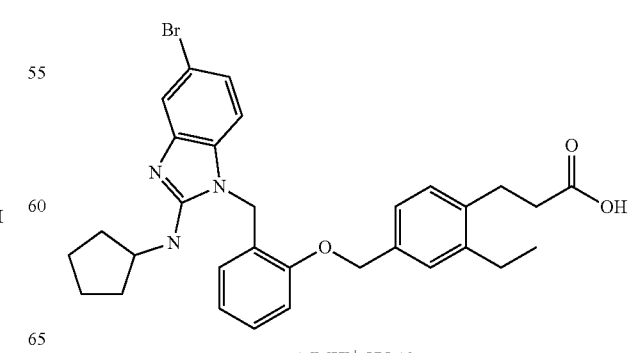
m/z[MH]+ 575.18

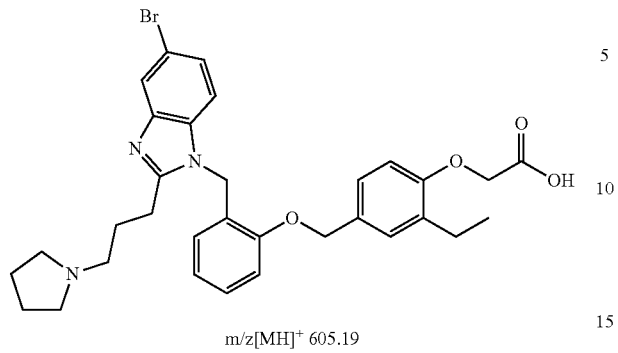

m/z[MH]⁺ 605.19

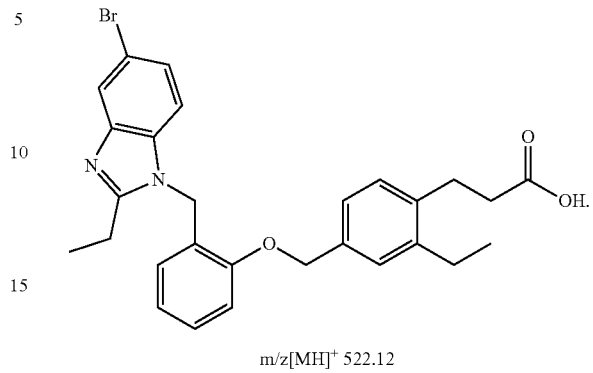

m/z[MH]⁺ 522.12

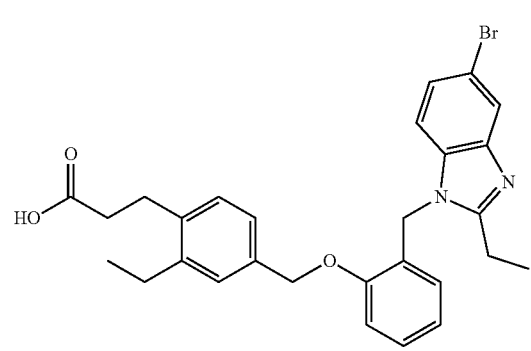 [SMILES: CCc1cc(COc2ccccc2Cn2c(CC)nc3cc(Br)ccc32)ccc1CCC(=O)O]

m/z[MH]⁺ 520.14

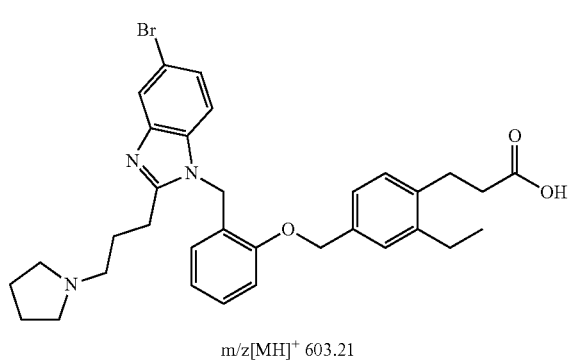

m/z[MH]⁺ 603.21

6. A pharmaceutical composition, comprising the compound or a pharmaceutically acceptable salt, polymorph, tautomer, stereoisomer, hydrate, solvate or isotopic variant thereof according to claim 1 and pharmaceutically acceptable diluents, excipients or carriers.

7. A method for treating a disease mediated by PPARα and/or PPARδ, comprising administering a therapeutically effective amount of the compound or a pharmaceutically acceptable salt thereof according to claim 1 or a composition comprising the compound or a pharmaceutically acceptable salt thereof according to claim 1.

8. The method according to claim 7, wherein the disease mediated by PPARα and/or PPARδ is hyperlipidemia, dyslipidemia, hyperchlolesterolemia, hypertriglyceridemia, HDL hypocholesterolemia, LDL hypercholesterolemia and/or HLD non-cholesterolemia, VLDL hyperproteinemia, dyslipoproteinemia, apolipoprotein A-I hypoproteinemia, disease of arterial sclerosis, disease of cardiovascular systems, cerebrovascular disease, peripheral circulatory disease, metabolic syndrome, syndrome X, obesity, diabetes, hyperglycemia, insulin resistance, impaired glucose tolerance, hyperinsulinism, diabetic complication, cardiac insufficiency, cardiac infarction, cardio myopathy, hypertension, fatty liver, non-alcoholic steatohepatitis, thrombus, Alzheimer disease, neurodegenerative, demyelinating disease, multiple sclerosis, adrenal leukodystrophy, dermatitis, psoriasis, acne, skin aging, trichosis, inflammation, asthma, hyper sensitive intestine syndrome, ulcerative colitis, Crohn's disease, pancreatitis, colon cancer, large intestine cancer, skin cancer, breast cancer, prostate cancer, ovary cancer, or lung cancer.

9. The method according to claim 7, wherein the disease mediated by PPARδ is any kinds of dyslipidemia, metabolic syndrome, obesity, atherosclerosis or diabetes.

10. The method according to claim 7, wherein the disease mediated by PPARδ is NASH or Duchenne muscular dystrophy syndrome.

11. The method according to claim 7, wherein the disease mediated by PPARδ is primary biliary cholangitis, or Alzheimer's disease.

12. The method according to claim 7, wherein the compound or a pharmaceutically acceptable salt thereof is to increase energy and activation properties of T lymphocytes to enhance immune function, transform tumor cells into adipose cells and reduce cancer metastasis.

13. The method according to claim 9, wherein the obesity is visceral fat type obesity.

* * * * *